(12) United States Patent
Chartrand

(10) Patent No.: US 11,409,505 B1
(45) Date of Patent: Aug. 9, 2022

(54) AUTOMATED AUTHORING OF SOFTWARE SOLUTIONS FROM A DATA MODEL WITH RELATED PATTERNS

(71) Applicant: 27 Software U.S. Inc., Mooresville, NC (US)

(72) Inventor: Christopher Zee Chartrand, Brantford (CA)

(73) Assignee: 27 Software U.S. Inc., Mooresville, NC (US)

( * ) Notice: Subject to any disclaimer, the term of this patent is extended or adjusted under 35 U.S.C. 154(b) by 0 days.

(21) Appl. No.: 17/232,520

(22) Filed: Apr. 16, 2021

(51) Int. Cl.
*G06F 8/35* (2018.01)
*G06F 8/36* (2018.01)
*G06F 8/71* (2018.01)
*G06F 8/38* (2018.01)

(52) U.S. Cl.
CPC ............ *G06F 8/35* (2013.01); *G06F 8/36* (2013.01); *G06F 8/38* (2013.01); *G06F 8/71* (2013.01)

(58) Field of Classification Search
CPC ..... G06F 8/35; G06F 8/36; G06F 8/38; G06F 8/71
See application file for complete search history.

(56) References Cited

U.S. PATENT DOCUMENTS

| | | | |
|---|---|---|---|
| 6,681,383 B1 * | 1/2004 | Pastor | G06F 8/30 717/126 |
| 7,062,502 B1 | 6/2006 | Kesler | |
| 7,716,591 B2 * | 5/2010 | Chen | G06F 16/972 715/745 |
| 7,720,872 B1 | 5/2010 | Biere et al. | |
| 7,853,922 B1 * | 12/2010 | Szpak | G06F 8/35 717/106 |
| 7,885,981 B2 * | 2/2011 | Kaufman | G06F 16/2423 707/802 |
| 8,010,701 B2 * | 8/2011 | Wilkinson | G06Q 10/06 709/219 |
| 8,719,781 B2 * | 5/2014 | Agovic | G06F 8/30 717/106 |

(Continued)

FOREIGN PATENT DOCUMENTS

| | | | | |
|---|---|---|---|---|
| CN | 11115917 A | 5/2020 | | |
| EP | 3557408 A1 * | 10/2019 | ............ | G06F 16/20 |

(Continued)

OTHER PUBLICATIONS

Manaranka, Irene, "Your Guide to Data Quality Management", Data Analytics, 15 pages (2020).

(Continued)

*Primary Examiner* — Douglas M Slachta
(74) *Attorney, Agent, or Firm* — David J. Thibodeau, Jr.; VLP Law Group, LLP

(57) ABSTRACT

Automatically generating code from an abstract model of a database. The abstract model is derived from a physical model which may be a source such as a legacy database, an entity relationship diagram, or other schema defining the data tables, objects, entities, or relationships etc. of the source. The generated code exhibits several patterns, interfaces and/or features including (a) separation of generated and developer code (b) context patterns (c) response/action patterns (d) language, database interfaces, operating systems and/or (e) user interface patterns.

29 Claims, 25 Drawing Sheets

(56) References Cited

U.S. PATENT DOCUMENTS

| | | |
|---|---|---|
| 9,244,971 B1 | 1/2016 | Kalki |
| 10,140,319 B2 | 11/2018 | Widjanarko et al. |
| 10,853,161 B2 | 12/2020 | Ahad |
| 2004/0249950 A1 | 12/2004 | Christensen et al. |
| 2004/0254939 A1 | 12/2004 | Dettinger et al. |
| 2005/0091227 A1 | 4/2005 | McCollum |
| 2005/0203940 A1 | 9/2005 | Farrar et al. |
| 2006/0041877 A1 | 2/2006 | Harsh et al. |
| 2006/0179025 A1 | 8/2006 | Bechtel et al. |
| 2007/0011332 A1* | 1/2007 | Raghavan ............... G06F 8/656 709/226 |
| 2007/0208764 A1 | 9/2007 | Grisinger |
| 2008/0046462 A1* | 2/2008 | Kaufman ........... G06F 16/2423 707/999.102 |
| 2009/0083697 A1* | 3/2009 | Zhang ...................... G06F 8/35 715/763 |
| 2009/0313613 A1 | 12/2009 | Ben-Artzi et al. |
| 2010/0082646 A1 | 4/2010 | Meek et al. |
| 2010/0138398 A1 | 6/2010 | Yoshizawa et al. |
| 2010/0313182 A1* | 12/2010 | Chen ........................ G06F 8/38 717/109 |
| 2011/0088011 A1 | 4/2011 | Ouali |
| 2012/0124550 A1* | 5/2012 | Nocera .................... G06F 8/76 717/104 |
| 2012/0311345 A1 | 12/2012 | Dhuse et al. |
| 2013/0145348 A1 | 6/2013 | Agovic et al. |
| 2013/0185362 A1* | 7/2013 | Clagg .................. H04L 63/102 709/225 |
| 2014/0280047 A1 | 9/2014 | Shukla et al. |
| 2014/0289702 A1 | 9/2014 | McMahon et al. |
| 2015/0067641 A1* | 3/2015 | Nyisztor ................ H04L 67/34 717/121 |
| 2015/0120729 A1 | 4/2015 | Slade |
| 2015/0205594 A1* | 7/2015 | Pruessmann .............. G06F 8/65 717/172 |
| 2016/0026461 A1 | 1/2016 | Bannister et al. |
| 2016/0132298 A1* | 5/2016 | Chalasani ................ G06F 8/34 717/104 |
| 2016/0313983 A1* | 10/2016 | Davidchuk ............... G06F 8/38 |
| 2016/0342397 A1* | 11/2016 | Goetz ....................... G06F 8/41 |
| 2017/0161138 A1 | 6/2017 | Oleynikov et al. |
| 2018/0129988 A1 | 5/2018 | O'Connell |
| 2019/0012354 A1 | 1/2019 | Wakana et al. |
| 2019/0155225 A1 | 5/2019 | Kothandaraman et al. |
| 2019/0182120 A1 | 6/2019 | Coccia |
| 2019/0228552 A1 | 7/2019 | Lee |
| 2019/0236282 A1 | 8/2019 | Hulick et al. |
| 2019/0266170 A1 | 8/2019 | Hazel et al. |
| 2019/0340287 A1 | 11/2019 | Tamjidi et al. |
| 2020/0106658 A1 | 4/2020 | Chandrasekhar et al. |
| 2020/0242532 A1 | 7/2020 | Kawamoto et al. |
| 2020/0257614 A1 | 8/2020 | Davis et al. |
| 2020/0387372 A1 | 12/2020 | Kalavathy et al. |
| 2021/0170693 A1 | 6/2021 | Sinclair |

FOREIGN PATENT DOCUMENTS

| | | |
|---|---|---|
| EP | 3557408 A1 | 10/2019 |
| WO | 2021011691 A1 | 1/2021 |

OTHER PUBLICATIONS

Gill, Jagreet Kaur, "Machine Learning Observability and Monitoring", Published by akira.ai/blog, 5 pages (2020).

Non-Final Office Action dated Jul. 8, 2021 mailed from the USPTO in related U.S. Appl. No. 17/232,444.

Spalka, "A Comprehensive Approach to Anomaly Detection in Relational Database", Data and Applications Security NCS 3654, pp. 207-221, IFIP International Federation for Information Processing (2005).

IBM, "Data Modeling", IBM Cloud (2020).

Final Office Action dated Oct. 21, 2021 mailed from the USPTO in related U.S. Appl. No. 17/232,444.

"Application Modernization" White Paper, DXterity Solutions, pp. 1-10, (2019).

Notice of Allowance dated Feb. 18, 2022 received in related U.S. Appl. No. 17/232,444.

* cited by examiner

AUTOMATED AUTHORING OF SOFTWARE SOLUTIONS FROM A DATA MODEL WITH RELATED PATTERNS

CROSS REFERENCE TO RELATED APPLICATIONS

This application is related to two U.S. Patent Applications entitled "Automated Authoring of Software Solutions by First Analyzing and Resolving Anomalies in a Data Model" and "Automated Authoring of Software Solutions From a Data Model", each of which are filed on the same day as this application, and each of which are hereby incorporated by reference.

BACKGROUND

The world is undergoing a digital transformation; using data to enable enterprises to become faster, cheaper, smarter and more convenient to customers. Companies, schools, churches, and governments around the world are collectively investing trillions of US dollars each year in technology to become more competitive and more profitable.

High quality software applications are core to a successful digital transformation. Here are some types of software projects that are part of nearly every such process:

New software applications and prototyping: Quickly-built prototypes of software programs initially prove that new business models can work. The prototypes are typically then re-written into much larger and scalable enterprise software applications. New software applications that are often used to disrupt older business models and large applications can take 18-24 months to construct using teams of developers.

Legacy software programs: Millions of decades-old programs are expensive to maintain and the programmers who built the programs have either died or retired, making it risky to touch, change, or upgrade those legacy software applications without experienced staff on hand. Old programs within a company's production environment create security vulnerabilities, are challenging to move to the cloud environment, and are prone to break, threatening a company's ongoing operations every day. The legacy applications must be replaced.

Integration: Software programs need to talk to other software programs more than ever before. To communicate and share data they use software apps, APIs (application programming interfaces), which are complex and specialized, requiring significant time to build.

Unfortunately, there are impediments and bottlenecks to digital transformation efforts. These barriers reduce productivity and reduce the quality of the software applications/programs that are produced. Some of the more important ones are:

Shortage of software developers: There is an estimated shortage of 1 million experienced programmers in North America. Companies are held hostage by lack of talent; productivity suffers, long delays to complete projects, growing backlogs of projects obstruct competitiveness and profitability.

Software development process: The process to develop software has not changed in decades. At the core, software programs are built through writing code "by hand". By its nature, this process is inefficient and lacks excellent tools and lacks adherence to common standards, run by individual developers who act more as "artists" who code in their own style.

Object-relational mapping (ORM) is a programming technique for converting data between incompatible type systems using object-oriented programming languages. ORM creates, in effect, a "virtual object database" that can be used from within the programming language.

In one application of ORM, many popular database products such as SQL database management systems (DBMS) are not object-oriented and can only store and manipulate scalar values such as integers and strings organized within tables. ORM tools can be used to translate the logical representation of the objects into an atomized form that is capable of being stored in a relational database, while preserving the properties of the objects and their relationships so that they can be reloaded as objects when needed.

US Patent Publication 2006/0179025 describes a system for managing a knowledge model defining a plurality of entities. The system includes an extraction tool for extracting data items from disparate data sources that determines if the data item has been previously integrated into the knowledge model. The system also includes an integration tool for integrating the data item into the knowledge model that integrates the data item into the knowledge model only if the data item has not been previously integrated into the knowledge model. Additionally, a relationship tool for identifying, automatically, a plurality of relationships between the plurality of entities may also be provided. The system may also include a data visualization tool for presenting the plurality of entities and the plurality of relationships.

US Patent Publication 2013/145348 is a software application platform that abstracts a computing platform, a database layer, and a rendering medium. A platform-independent application programming interface is disclosed, as well as an abstract database layer. The abstraction of the database layer comprises two sub-layers, including a layer having a uniform interface that treats data records as plain objects and a layer having constructs that facilitate the automated generation of user interfaces for data record navigation and management. Further, a software application platform that is independent of rendering medium is disclosed.

US Patent Publication 2010/082646 describes techniques for object relational mapping (ORM). A dependency graph generator receives a combination of object level custom commands and store level dynamic commands. Each store level dynamic command is generated from at least one object level dynamic command. An identifier is assigned to each entity present in the object level custom commands and the object level dynamic commands. A store level dynamic command includes any identifiers assigned in the corresponding object level dynamic command(s). The dependency graph generator is configured to generate a dependency graph that includes nodes and at least one edge coupled between a corresponding pair of nodes. Each node is associated with a corresponding store level dynamic command or an object level custom command. An edge is configured according to an identifier associated with the corresponding pair of nodes and a dependency between commands associated with the corresponding pair of nodes.

SUMMARY OF PREFERRED EMBODIMENTS

This patent relates to techniques for automatically generating code and related artifacts such as application programming interfaces (APIs) and related documentation from an abstract model. The abstract model is generated from a source such as a legacy database, an entity relationship diagram, or other schema defining the data tables, objects, entities, or relationships etc. in the source. The generated code exhibits several patterns, interfaces and/or features.

Separation of code that is automatically generated and code that is typically written by a software developer. Through use of software patterns and interfaces, generated code is distinct and self-contained versus developer-generated extended code (both physically and conceptually). Custom code is never lost allowing for instantaneous code regeneration. As a result, developers may stay focused on what is important without being distracted by all the "base" code.

Context patterns. Code for selected contexts is retained as distinct, replaceable and upgradable blocks without modifying any underlying code structures (classes). These may include Localization, Messaging, Logging, Exception management, Auditing, Validation, Cryptography, Email, and Cache management classes.

Response and action patterns. A common ability (via a rich object) for methods to serialize and communicate within and between application tiers. This massively simplifies and stabilizes generated code, making it easier to integrate User Interface (UI) feedback as a response pattern persists through application tiers.

Code generator (Author) patterns. Both data sources and programming languages are abstracted by the code generation technology, allowing for the ability to extend into other technologies existing or in the future. This may include code generation patterns for language interfaces, output interfaces, database interfaces, common replacement utilities, method factories, class factories, operating systems and the like. The level of meta-programming has many auxiliary benefits such as the ability to generate valuable documentation and even code metrics.

User Interface (UI) patterns. A rich user interface is built from the model. The generated UI may be extended via the functionality within the UI in order to customize the final user interface experience for enterprise applications. The generated solution is different since it is driven solely by meta data provided from the model and configuration data—making maintenance of the solution significantly easier.

More particularly, a model is used to generate base application code and an extended application code structure. The extended application code structure is used for subsequent placement of extended application code. Components of the extended application code may include one or more code extensions, attributes, properties or rules for the database that are specified other than by generating from the model. Patterns are further provided that define aspects of the generated code.

The extended application code structure may be stored separately from the base application code.

The base application code and extended application code structure may then be exposed for review such as a by a developer. Developer modifications, if any, to the base application code are then accepted.

The patterns may comprise context patterns that define handler classes for one or more contextual elements for the generated code. These contextual elements may be global to the application. In still other aspects, the contextual elements may be Localization, Messaging, Logging, Exception management, Auditing, Validation, Cryptography, Communications, or Cache management elements.

In other aspects, the patterns may include action-response patterns that define responses generated when corresponding actions are taken. The action-response patterns may define serialization of responses among code tiers or between code tiers. In some implementations, the code tiers may include application logic code, API code and UI code. In other aspects, the action-response patterns may include append methods that define how to respond to successive responses from other tiers.

The base code and extended application code structure may be further organized such as by language and then by project.

The base code may also include constructors, declarations, methods and properties classes, or code generation-related tasks.

A schema may be used to define attributes of a user interface associated with classes. As such, a user interface may then be generated by consuming the schema at a time a web page view is requested by a user.

BRIEF DESCRIPTION OF THE DRAWINGS

Additional novel features and advantages of the approaches discussed herein are evident from the text that follows and the accompanying drawings, where:

FIG. 9 is an example pattern for public context code.

FIG. 17 shows an example .Net framework for code generation tasks.

DETAILED DESCRIPTION OF ILLUSTRATIVE EMBODIMENT(S)

System Overview

As explained above, the present invention relates to a system and methods that may consume a data source and transform it into an abstract model. The abstract model may then be extended and then used to automatically generate into generated base code, Application Programming Interfaces (APIs), User Interfaces (UI), documentation, and other elements. Each of the generated base code, generated base APIs and generated base UIs may be extended. Extended elements are maintained in a framework, such as a different source code file, separately from generated based code elements. Of specific interest herein is that the generated code conforms to a variety of patterns.

Figure 1:
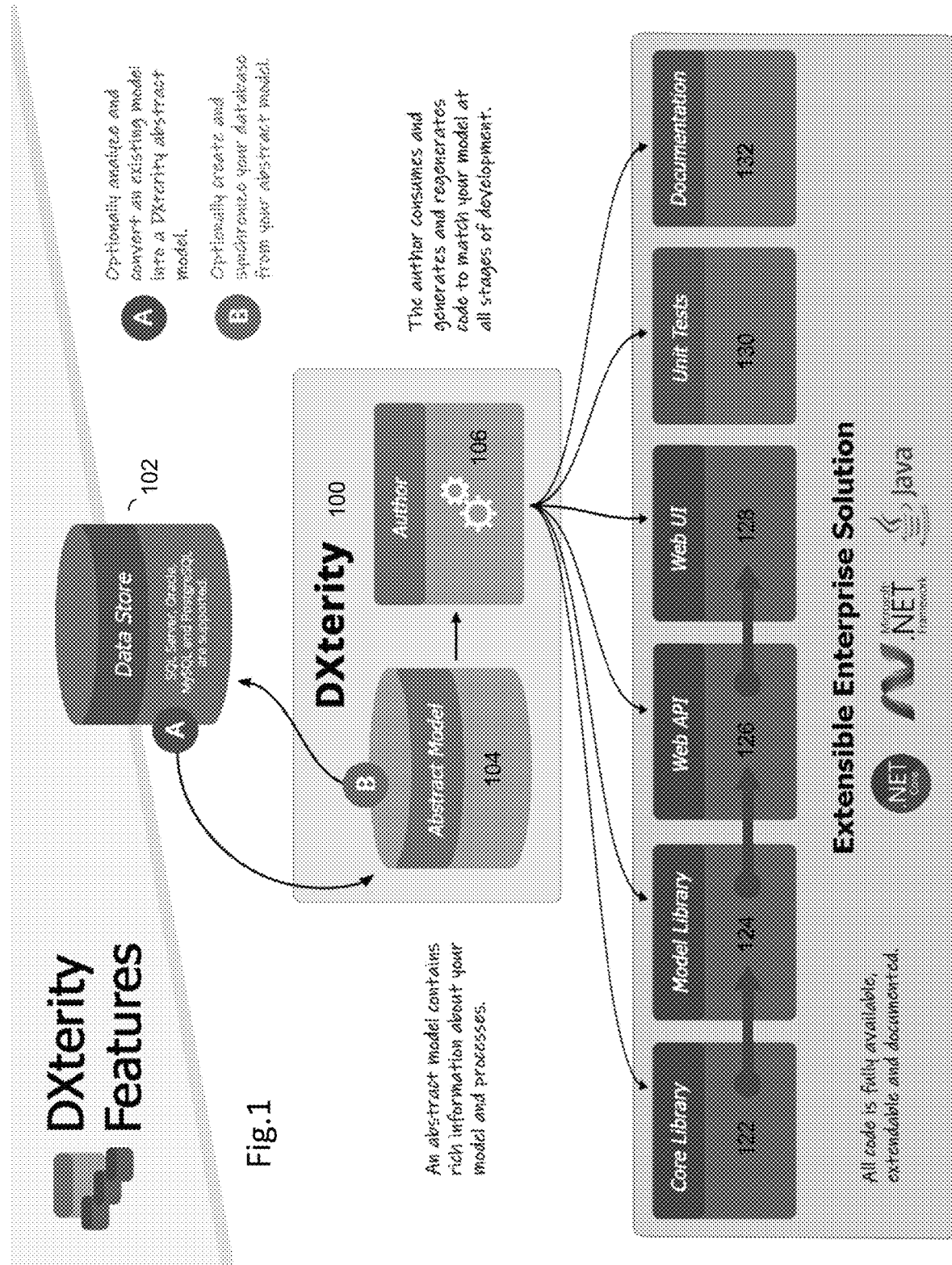
FIG. 1 is a high-level diagram of the features of an example platform for automatic code generation.

An example implementation is now described and shown, starting with FIG. 1. Here a data source, such as data store 102, is made available to a code generation tool or platform 100 (also referred to herein as the DXterity platform). The data store 102 may, for example, be a database associated with a legacy software application. However, it should be understood that the source may not necessarily be a legacy application but some more recent application or even a new application under development. The data store 102 may be in any common form such as MySQL, SQL Server, DB2, Oracle, Access, Teradata, Azure, PostgreSQL or the like. The DXterity platform 100 is then used to generate an abstract model 104 from the input data store 102. The abstract model 104 is then fed to an author 106. The author 106 automatically consumes the model 104 to generate and regenerate code to match the model 104. The author may generate the code in certain forms, and also generate other artifacts related to the model 104. For example, the author 106 may generate or may use a core code library 122 and/or model library 124. But the author may also generate application base logic, a web application interface 126, a user interface 128, unit tests 130, and/or documentation 132 from the abstract model. The input source may describe the data in a database in other ways, such as via an entity relationship diagram, as explained in more detail below.

The abstract model is generated in a particular way to help ensure that the resulting code 122, 124 conforms to expected criteria. For example, DXterity 100 may be configured to ensure that the resulting generated code and artifacts 122-132 provide an extensible, enterprise-class software solution with late binding on UI and API elements. As now understood from the discussion below, this is accomplished by ensuring that the abstract model itself conforms to certain metrics or conventions prior to code generation. Enterprise class software is computer software used to satisfy the needs of an organization rather than individual users. Enterprise software forms integral part of a computer-based information system that serves an organization; a collection of such software is called an enterprise system. These enterprise systems handle a chunk of data processing operations in an organization with the aim of enhancing the business and management reporting tasks. The systems must typically process information at a relatively high speed and can be deployed across a variety of networks to many users. Enterprise class software typically has, implements or observes many of the following functions or attributes: security, efficiency, scalability, extendability, collaboration, avoidance of anti-patterns, utilization of software patterns, architected, designed, observes naming and coding and other standards, provides planning and documentation, unit testing, serialized internal communication, tiered infrastructure, exception management, source code and version control, and includes interfaces for validation, messaging, communication, cryptography, localization, logging and auditing.

Figure 2:
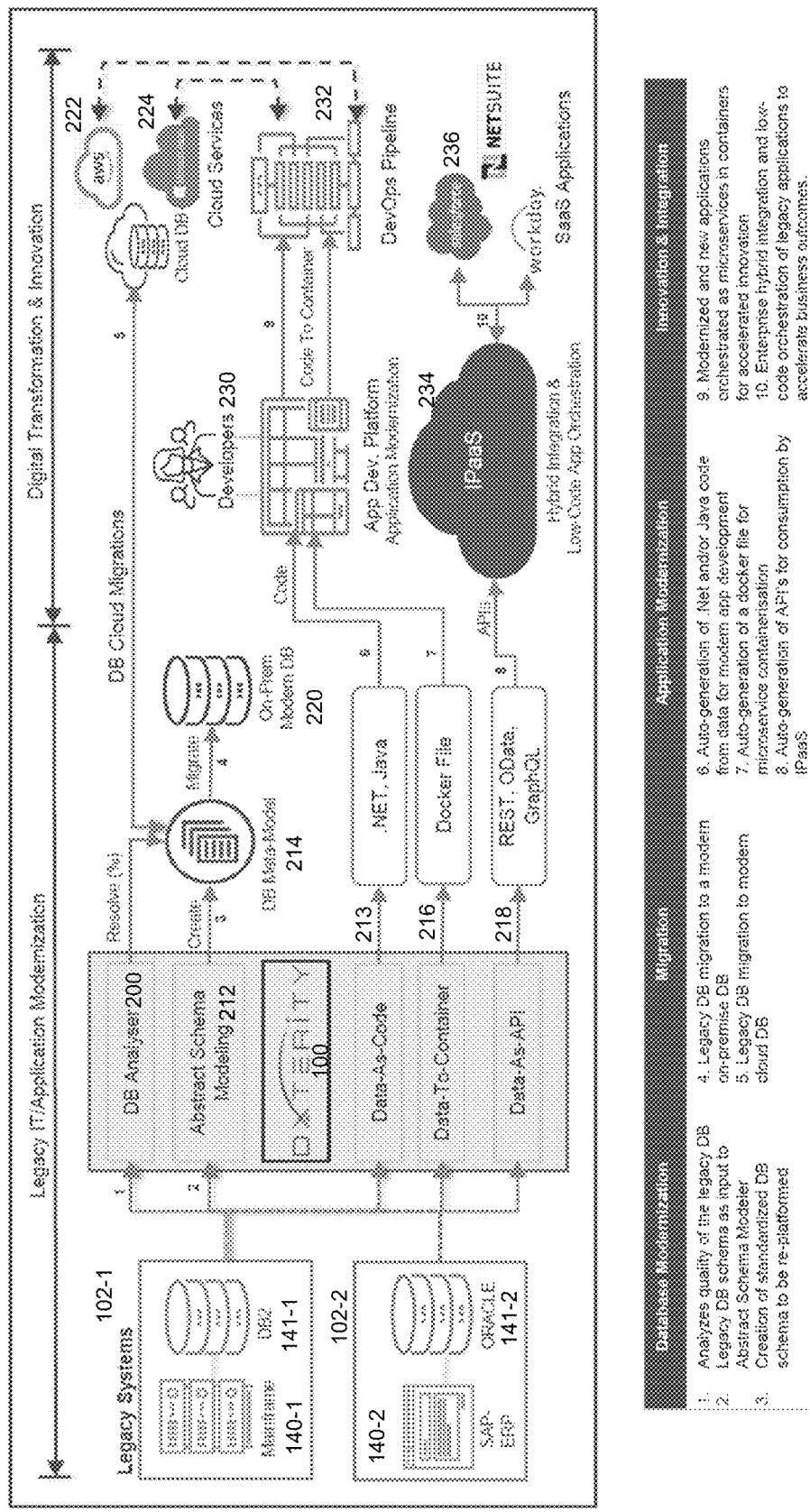
FIG. 2 is a more detailed view of an example platform.

FIG. 2 illustrates an example implementation in a bit more detail than FIG. 1. Here there are two input data stores 102-1, 102-2, respectively associated with two legacy systems including an IBM mainframe 140-1 running a DB2 instance 141-1 and an SAP/ERP application accessing an Oracle database 141-2.

The DXterity platform 100 consists of an analyzer component 200 and a schema modelling component 212. The schema modelling component 212 generates abstract models of the legacy databases 141-1, 141-2.

The analyzer component 200 analyzes the abstract models of the legacy databases 141-1, 142-2 against selected metrics, generates a score, and recommends resolutions to improve the scores.

A standardized database schema is then output from DXterity 100 as a meta model 214. The meta model 214 may then be re-platformed in various ways. For example, it may be migrated to an on-premise modern database 220. Or the meta model may be migrated to a cloud provider 222 or as a cloud service 224.

Artifacts generated by DXterity 100 may also be fed to other related functions, including an application development platform 230 that drives DevOps pipelines 232, or integration/orchestration environments 234 that support specific application development platforms 236.

Also, of interest is that the DXterity platform 100 may be used to generate its result as data-as-code (e.g., as .NET, or Java), data-to-container (e.g., as a Docker file), or data-as-API (REST, OData, GraphQL, etc.).

Characteristics of the Code Authored from the Abstract Model

Figure 3:
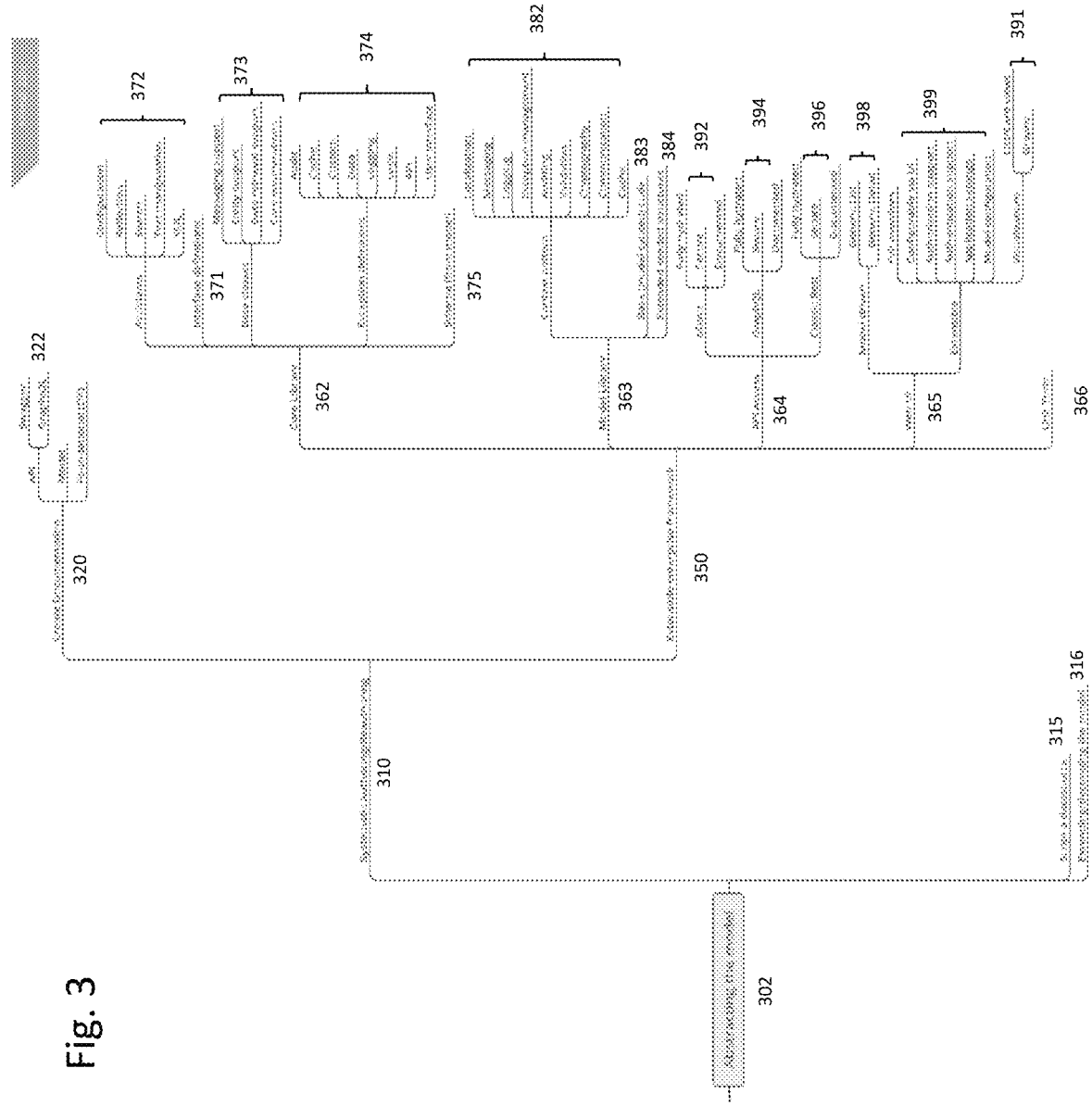
FIG. 3 is a diagram illustrating a hierarchy of functions performed on an abstract model to generate code as an extensible enterprise-class framework, Application Programming Interface (API), User Interface (UI) and related documentation.

FIG. 3 is one example of a hierarchical list of the functions, structures and concepts that may be performed or authored by the DXterity platform 100. An abstracting function 302 takes the physical model and generates an abstract model.

From the abstract model, then systematic authoring/re-authoring functions 310 may proceed. Systematic authoring 310 consists of automatically generating the extensible enterprise framework as executable code 350 as well as creating the related documentation 320.

Other functions or operations such as scripting a data source or extending 315 and decorating 316 may also be performed on the abstract model.

The generated extensible framework 350 architects the authored (generated) code in a particular way. More specifically, the code generated may be arranged into a core library 362, model library 363, API access 364, web UI 365 and unit test 366 elements.

In an example implementation, the core library 362 may further include code grouped as assistant functions 372 (including configuration parameters, reflectors, search, text manipulation, and XML), interface definitions 271, base classes 373 (including messaging support, entity support, data retrieval support, or core enumerations), exception definitions 374 (including audit, cache, custom, data, login, logic, API, and user interface, as well as schema definitions 375.

The model library 363 may involve generating context patterns 382 (including localization, messaging, logging, exception management, authoring, validations, cryptography, communication and caching), base code 383, and extended structures 384.

API access 364 may be generated in any of several API formats including OData 392, GraphQL 394, or REST 396 each of which may be accordingly hydrated, secure and documented.

The generated web UI 365 artifacts are also driven 398 from the abstract model in which case generic list and generic details are provided; or they may be extensible 399 (including overrides, configurations, authorization and authentication support with application settings 399 and/or model configurations and/or visualizations 391.

Figure 4:
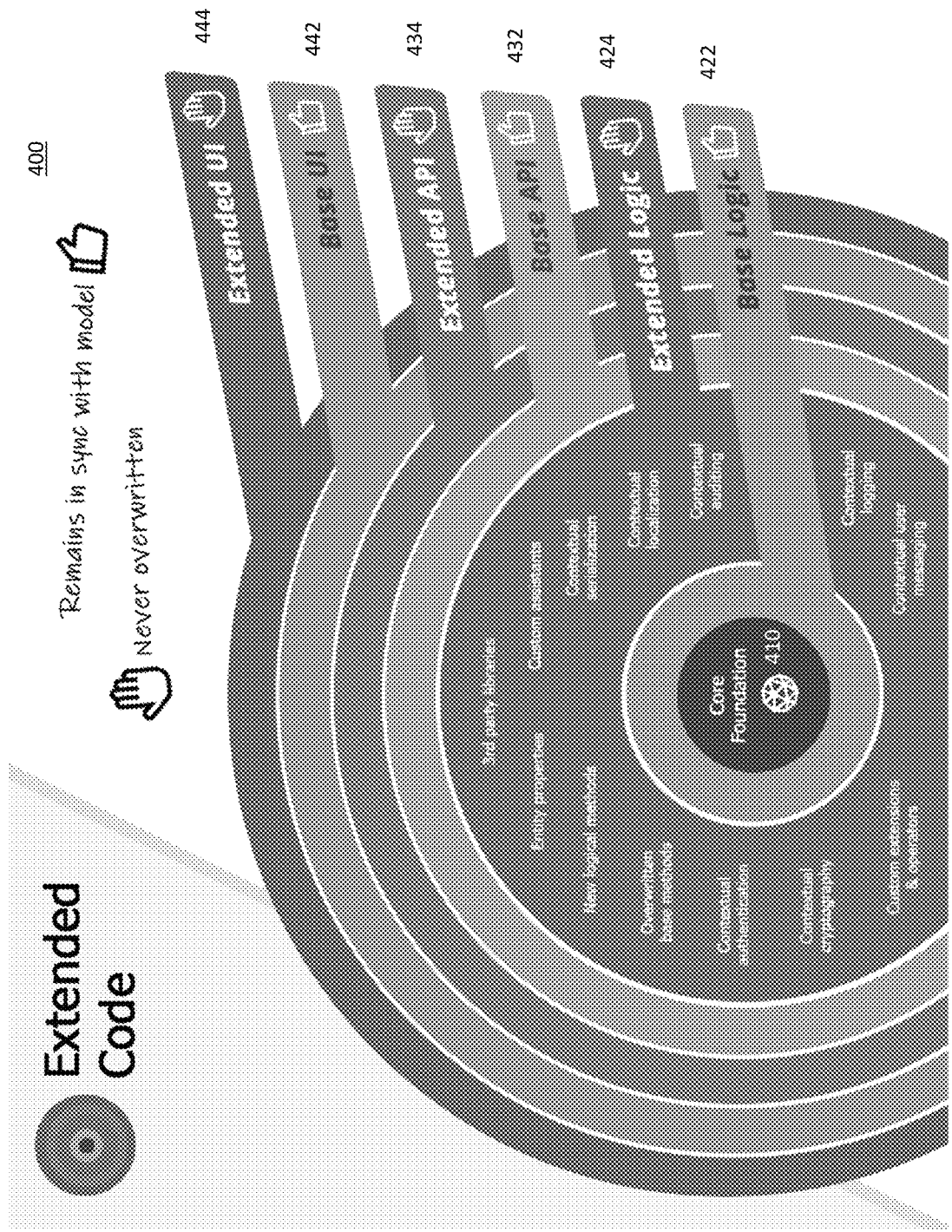
FIG. 4 is a conceptual diagram illustrating how the resulting code is arranged in a hierarchy of code blocks including core, base and extended logic, base and extended APIs, and base and extended UIs.

FIG. 4 illustrates the hierarchy of the generated code and of the extended code. More particularly, the generated code is divided into a core code foundation 410 and application specific logic including base logic 422, which is segregated from the extended application logic 424. API code is also arranged as generated base API code 432 and extended API code 434. Web UI code similarly includes generated base UI code 442 and extended UI code 444. The different code elements including base application logic 422 and extended application logic 424 are stored separately from one another, such as in different files. Similarly, base 432 and extended 434 API code are stored separately from one another, as are Web UI base 442 and extended 444 elements.

As mentioned previously, the core code 410 consists of elements that are used by more than one application or solution. For example, the core code may include common libraries and similar functions.

The base components specific to the application such as base logic 422, base API 432 and base UI 442 are automatically generated from the abstract model and always remain in sync with the model. Therefore, even though the developer is permitted to view and even edit the base application code 422, base API code 432 and Web UI base code 442, these base components are preferably rewritten whenever the developer requests code to be re-generated from the model.

The generated structures (or frameworks) may be used by the developer for placement of extended code including extended application code 424, extended API code 434 and extended Web UI code 444. These frameworks may thus be exposed to a developer for review (such as a data architect) and also made available for modification. These extended code elements, once modified, are not permitted to be overwritten by any subsequent automated regeneration of code. However, in some implementations, the extended code elements may be overwritten before any developer modifications are made to them. In some implementations, extended UI code may be stored in a configuration file to, for example, enable late binding as explained elsewhere.

As also shown in FIG. 4, patterns implemented by the extended code components may include a variety of methods and properties supplied by the developer. As the figure suggests, these may include overwritten base methods or entity properties, third party libraries, new logical methods, contextual serialization or context localization, contextual cryptography authentication, contextual user messaging, logging, auditing, custom extensions or operators. Again, these may be stored as part of the extended logic 424 or other components such as extended API 434 or extended Web UI 444.

Separation of Generated Code from Extended Code

As may now be appreciated from FIG. 4, the resulting code artifacts are layered or tiered. A lower tier provides a core foundation that is shared. Wrapping the core foundation is a base logic tier specific to the application. As with the core foundation, the base logic stays in sync with the abstract model every time code is generated or authored from the model.

The base logic tier is next wrapped by an extended logic tier. There may be numerous things a developer may do to extend the application logic.

Wrapped around that in turn is a base Application Programming Interface (API) tier which then in turn is wrapped by an extended API tier.

Next, a base User Interface (UI) tier may be wrapped by an extended UI tier. It is preferred to arrange code with the UI on the outside of the hierarchy because that code is what the end user observes as the application's behavior.

Figure 5:
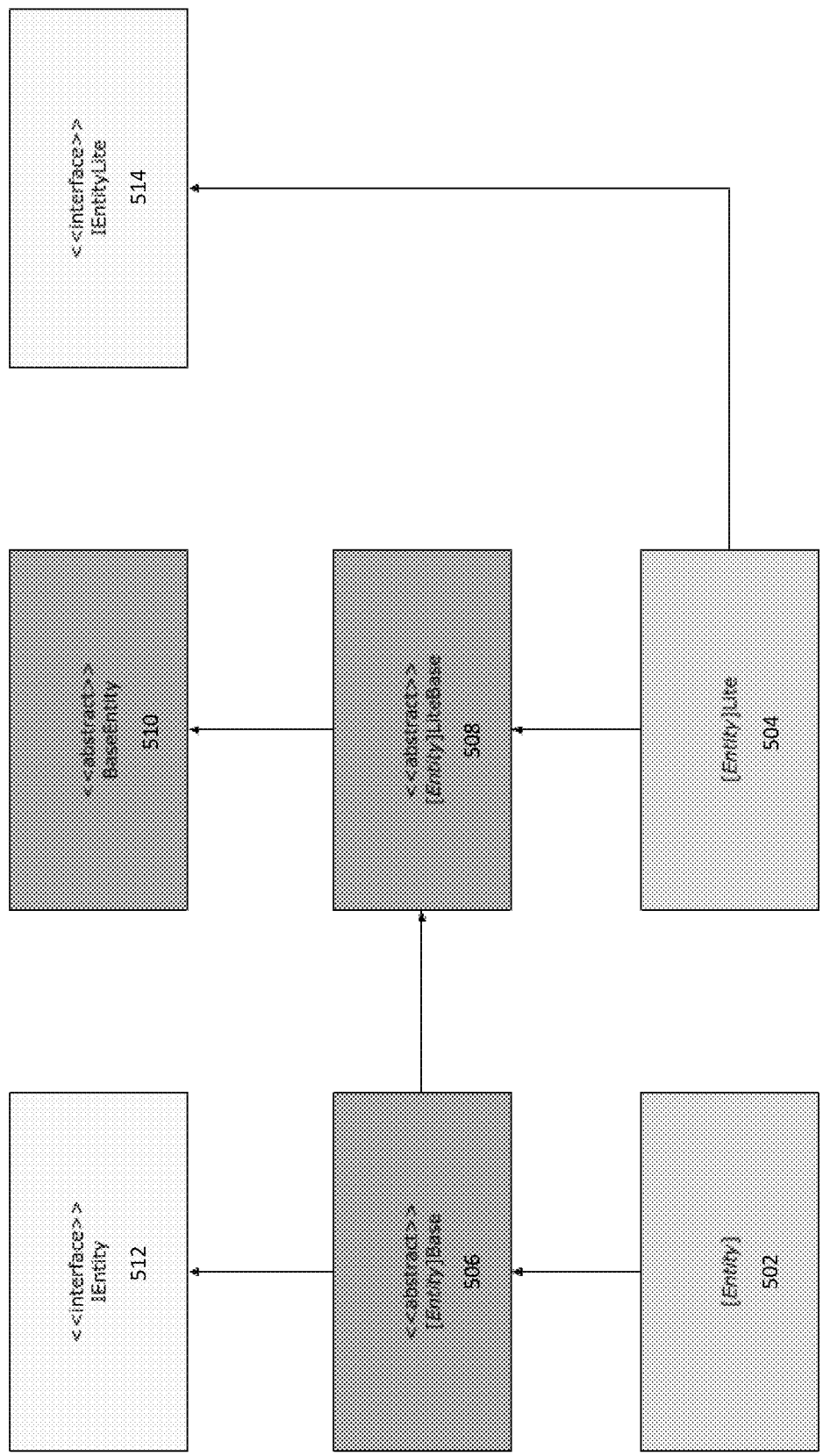
FIG. 5 is an example class diagram illustrating resulting patterns of generated code.

FIG. 5 is a class diagram visualization of the resulting code patterns illustrating how base code and extended code are split and separately controlled. The extended [entity] classes 502, 504 are what the developer may actually or should actually modify. Base code elements 506, 508, 510—although perhaps viewable by the developer—always stays in sync with the model. And the remaining classes 512, 514 are actually interfaces as provided by the DXterity tool.

Figure 6:
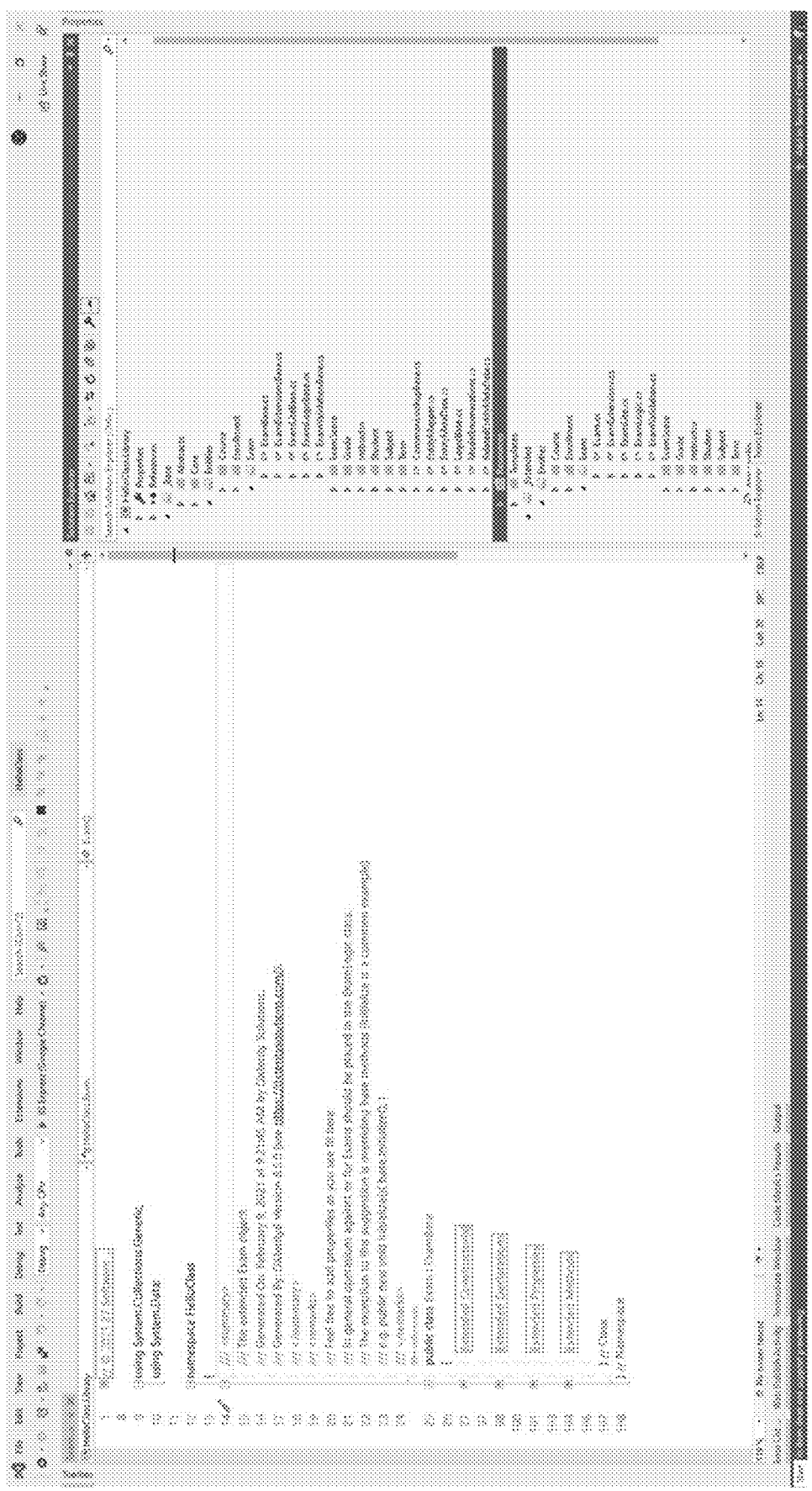
FIG. 6 is an example of code generated for a database application intended to support a university.

FIG. 6 is an example of the code generated for a particular application. The application may be used by a university to track entities such as courses, student enrollments, instructors, exams, exam scores, grades, students, subjects, terms, and the like. The resulting code may be viewed and/or edited by a developer using a tool that allows them view the generated solution (referred to as the solution explorer herein).

Using the solution explorer, the developer may see that generated code has been separated into different elements or project folders, including folders for a core library, a folder for base code, and a folder for extended code.

For each of the entities, separate files, folders (or other structures) are provided within the base code and extended code structure. Separate files, folders (or other structures are also provided for properties, references, resources, templates and other elements. As explained above, the base elements stay in sync with the model. So, for instance if the model is changed to add a column to the instructor table, then the base code for the instructor class will typically be changed.

Figure 7:
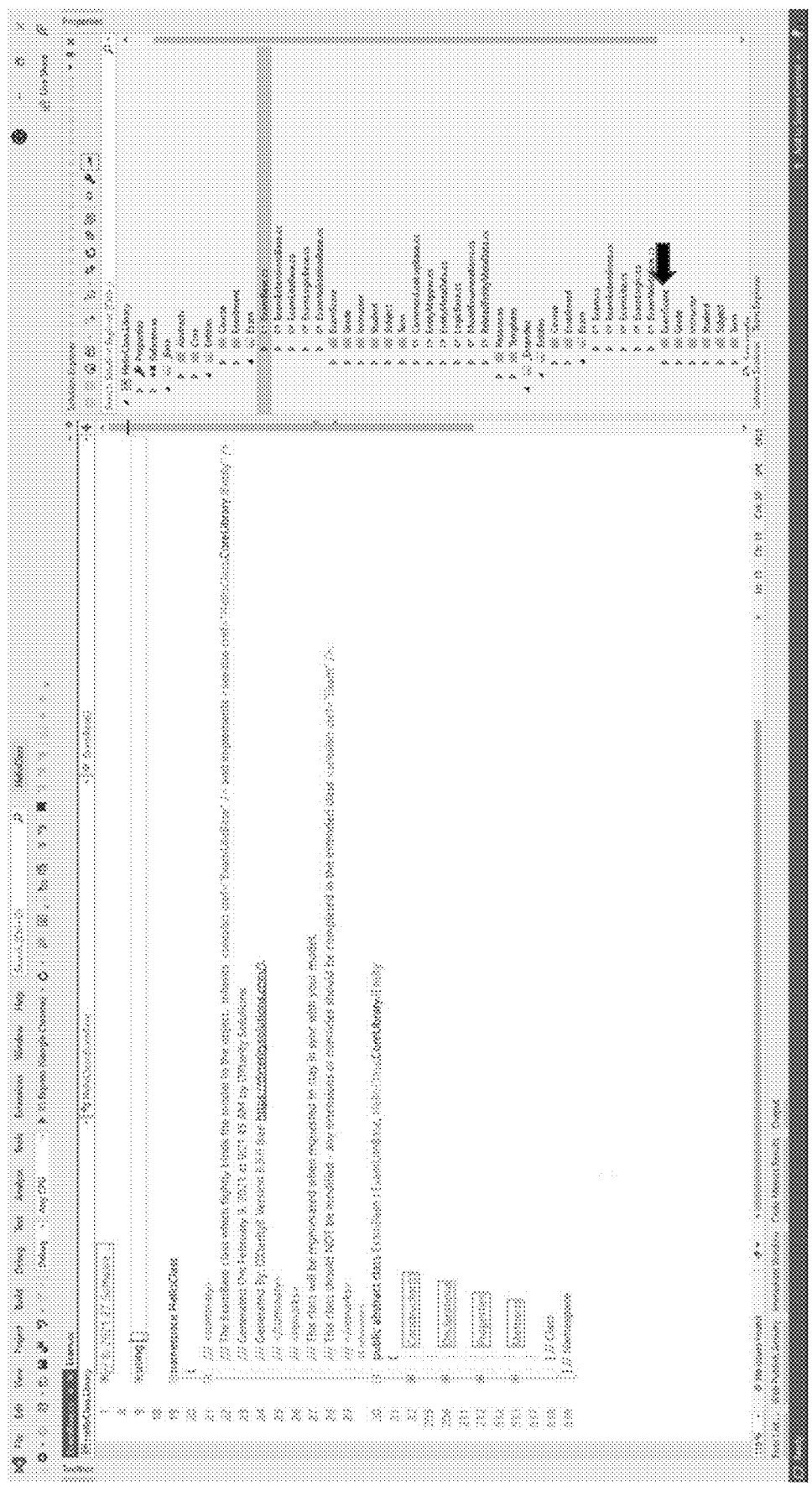
FIG. 7 shows how a developer may review the patterns of generated code including separate structures for base code and extended code.

The developer is permitted to review all parts of the generated code for a class. As shown in FIG. 7, the developer may see when the base code for the ExamBase class was generated, and drill down to view the details of its code elements such as its constructors, declarations, properties, and methods. The DXterity platform may display a warning in this view of the base code that the class will be regenerated and that this code should not be modified.

The generated folders also provide a structure for the developer to place their extensions and modifications. Should the developer wish to have an extended property for the ExamScore class, then as shown in FIG. 7, the developer would navigate to the corresponding extended code section as indicated by the pointer. An extended method for that class may also be placed in the same folder.

These sections may typically be blank or empty when the framework is initially generated. The generated structure also informs the developer as to the inheritance properties. For example, if the developer navigates to ExamBase she may see that inherits ExamLiteBase. And if she navigates to ExamLiteBase she may view that code and see that inherits EntityBase.

The developer may view the structure, see what each of the components of the class contain, and that they are in sync with the model. The developer may also determine where to write and store extended code or unit test code, and remain confident that such extensions and unit tests are preferably not overwritten each time the base code is re-generated.

Figure 8:
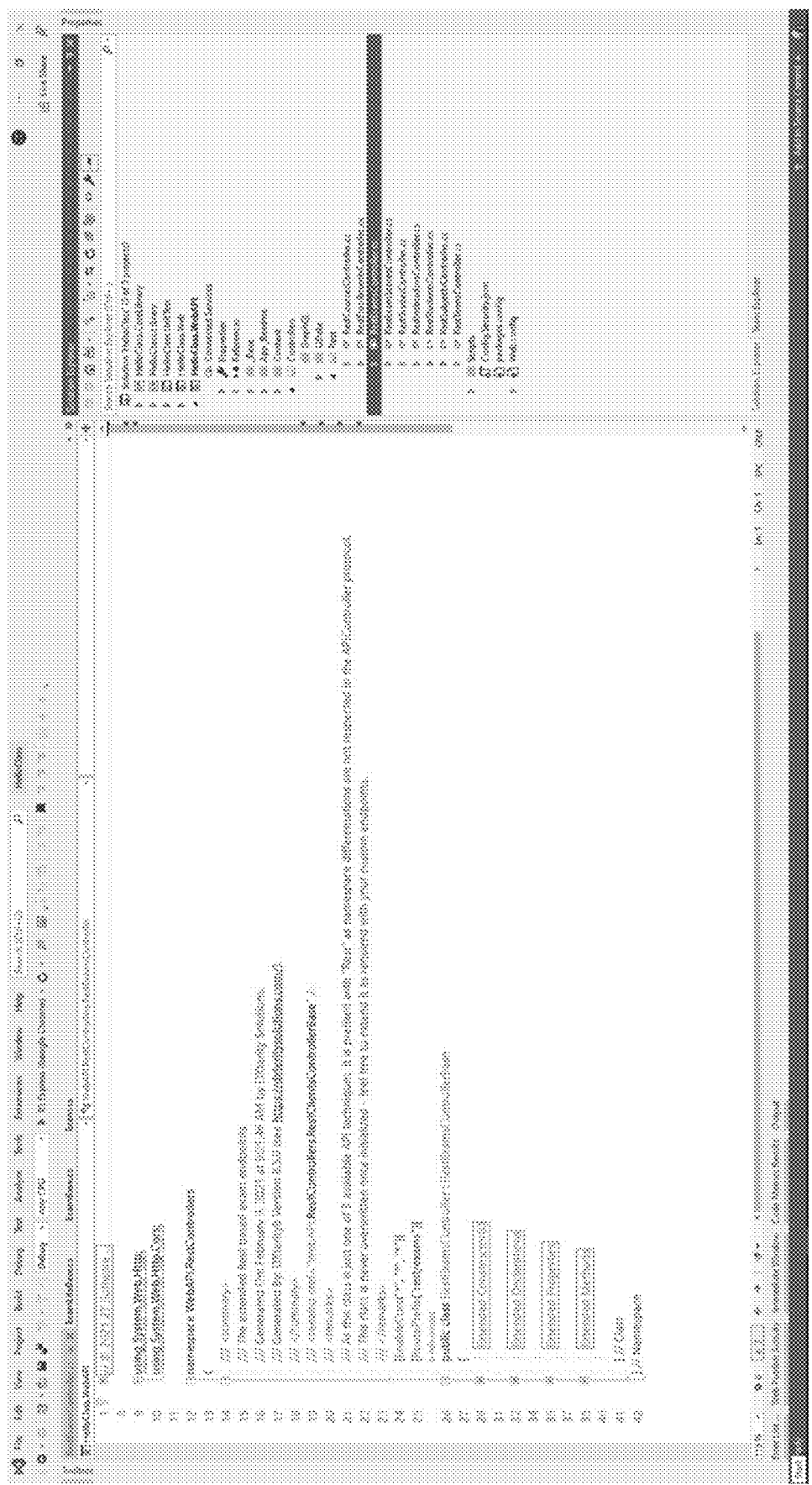
FIG. 8 is a similar example showing separately stored code for an API.

The same is true for generated API code. See FIG. 8 as an example. If the developer wants to create extensions to implement a GraphQL, OData or REST they navigate to this screen. Here the developer is in the process of extending a REST API for the exam class. The generated structure for the constructors, declarations, properties, and methods, although initially blank, provide a well-defined location for the developer to place any extended code and its attributes. Note that the generated "dummy" extended code may include comments that inform the developer that they are free to extend these code sections and that they are preferably not overwritten once initialized.

Enforcing a structure or framework for generated and extended code in this way (for logic, APIs and UIs) is valuable. It enables developers to stay focused on what is important to their particular end uses, without being distracted by base code logic.

In addition, the code generated from the model may in most cases be operated immediately after generation. In the university example, the university's administrative staff may immediately enter, access, and/or update data for the student enrollments associated with a particular semester course.

Context Patterns

The code generation processes implemented by the DXterity platform 100 may also implement what are called context patterns.

Figure 9:
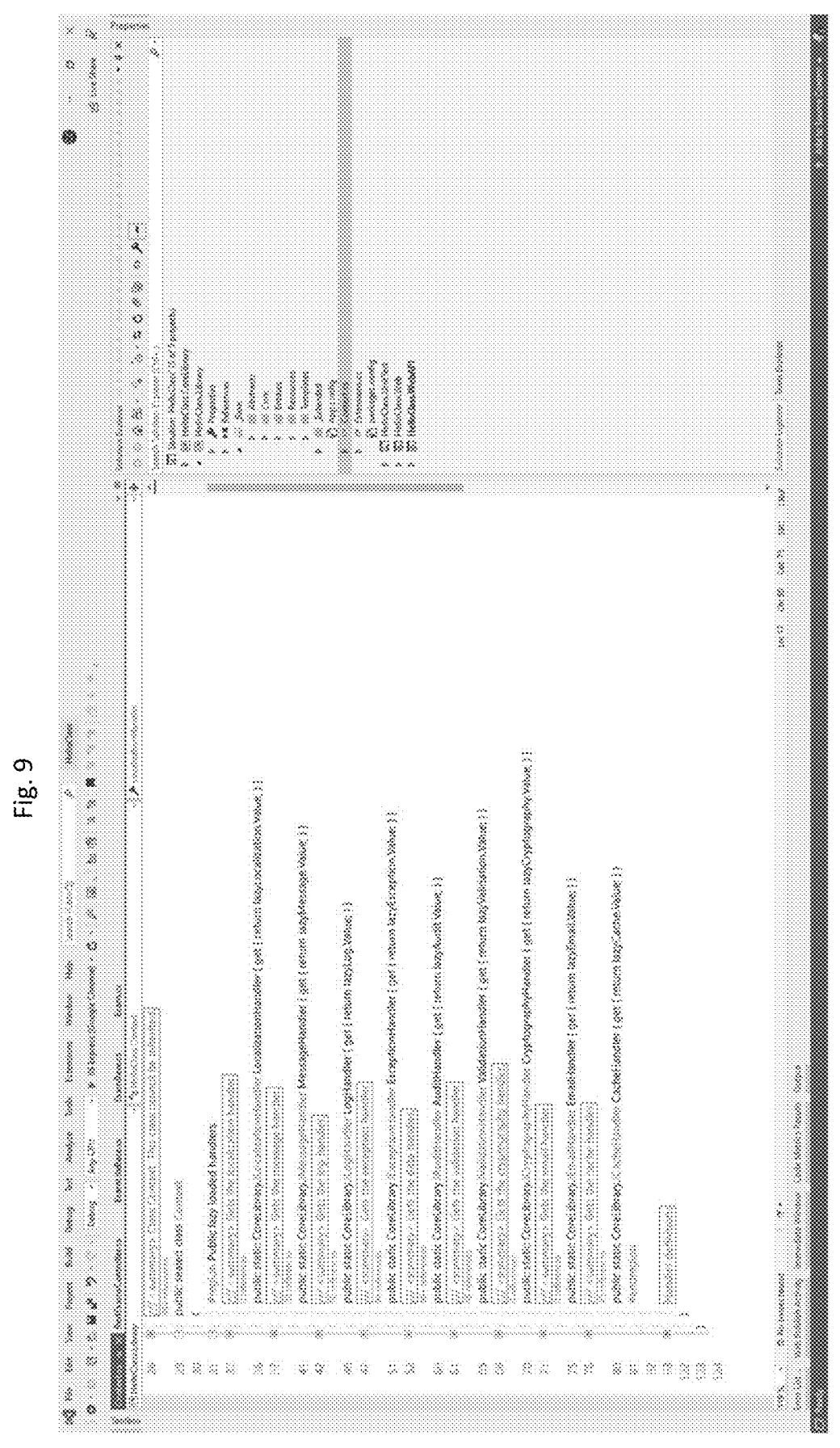

FIG. 9 is an example of a public class that is created by the code generation process called context. The context class serves to store or manage a number of lazy loaded handlers for different features considered to be contextual, in the sense that they may wrap or envelope the entire application.

One example context is localization. Localization is referring to features such as a time format or currency format or date format specific to a physical region or place where the application is hosted.

The next thing is a message handler. This context entity may be used to enforce language specific behavior. In one example, the application may be hosted in a bi-lingual country such as Canada that may require both French and English versions of an API or UI. The language context may thus be used as a single place to hold common messages that may be propagated throughout the application.

A logging handler may be used for storing global attributes for how a class is to log events. It may specify how, where, when, and what to capture in a log as well to what degree an event should be logged An exception handler specifies how to manage exceptions across tiers. For instance, a developer may want to raise an exception in a tier that occurs in the UI layer.

The audit handler may serve to manage how data changes. This aspect of the context class may be used to implement auditing of reads, writes, and edits to the database, and specify which classes or objects the developer wants to audit, when, and how often. For example, an object that represents new tuition payment entries may need to be audited every Thursday at noon, but continuously monitored for any changes.

The validation handler may be used to validate attributes of selected objects, such as their format, and for other purposes.

A cryptography handler may implement different rules for encrypting data. In the university example, say, the instructor class may remain unencrypted, but a personal identifier column in a student class may need to be encrypted. Entities in an application that support a bank may have different encryption requirements than an application that supports a social media platform.

The handler, or more generally, a communication handler, may also implement criteria specific to these functions. For example, an email handler may specify using an SMTP protocol and API.

A cache handler may specify whether caching is available for data, mechanisms for how it is to be used, how often the application should refresh the cache, and so on.

As can be appreciated, these attributes of the application considered contextual may thus be implemented in a centralized context pattern.

Figure 10:
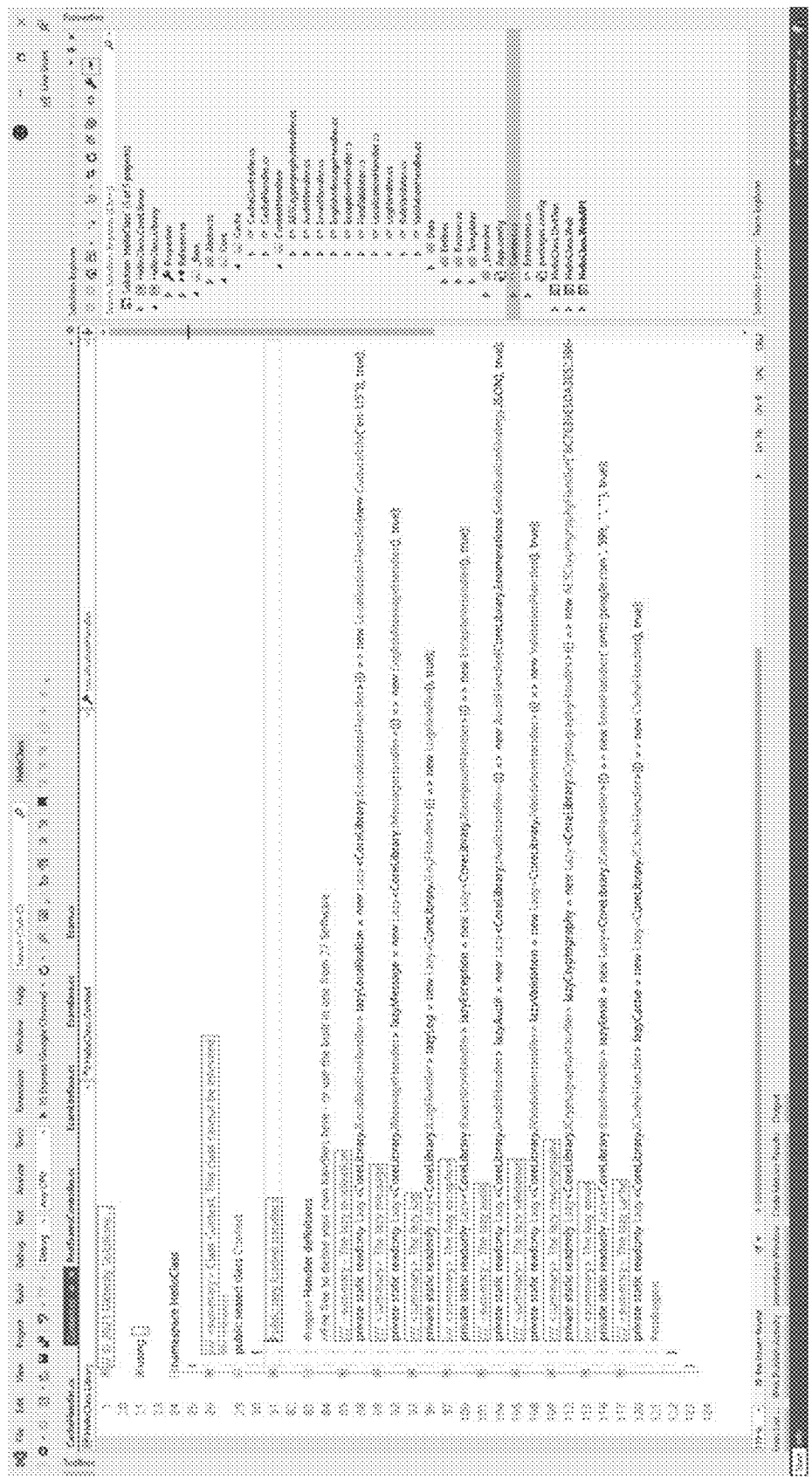
FIG. 10 is an example pattern for private context code.

Contexts may also be considered private and specifically include developer generated code. In other words, "public" or "default" contexts may be overwritten—and the generated code then may provide the developer with a defined location to place such developer-provided extensions. See FIG. 10.

For example, it may be desirable for the cryptography handler to be customizable. Perhaps the DXterity platform is configured to generate code that implements AES cryptography via the public cryptography handle. However, in one example use case, the developer determines that a selected class needs to be protected with an alternate secure method such as triple DES. That change may be specified in a private static handler that the developer writes and stores separately from the public, global handler.

Similarly, a different authentication method may be desirable for an email handler. Rather than modify a public communication handler that uses SPF, the developer prefers DMARC authentication method in the private handler pattern. DXterity centralizes where all of the attributes are enforced. In this example, the email handler may be modified in one central location, instead of the developer having to make separate modifications in each and every place in the code related to the content for emails to be sent (such as warnings, updates, communications to clients, etc.).

Response and Action Patterns

Responses and actions may also be implemented according to defined patterns. This approach avoids a problem where the code that controls responses and actions with and between tiers may otherwise become fragmented.

In an example where a user of a typical enterprise application and data source might be asking the application "How many widgets did we sell last month?" Referring to FIG. 4, such a query might generate database command messages that include an "action" (such as "get data") that travels or "bubbles down" from a custom UI tier (which defines the visual that the user sees) to say five or more tiers before it arrives at the application logic tier to be processed. The response then bubbles all the way back up through those same tiers to the extended UI tier which finally displays the answer to the user. In any of those tiers the action-response pattern could encounter an error that involves rich data or some other problem.

In a typical enterprise application, there is no standard defined within the application logic in the model (nor across different applications) of how communication should be serialized and transferred between tiers—or worse, there may exist multiple unique methodologies all within the same solution. It is common for problems to occur within a specific tier. For example, when a method needs to call another method which results in calls toother methods that summarize the requested data.

Defined patterns to manage messaging between and within tiers is therefore desirable.

Figure 11:
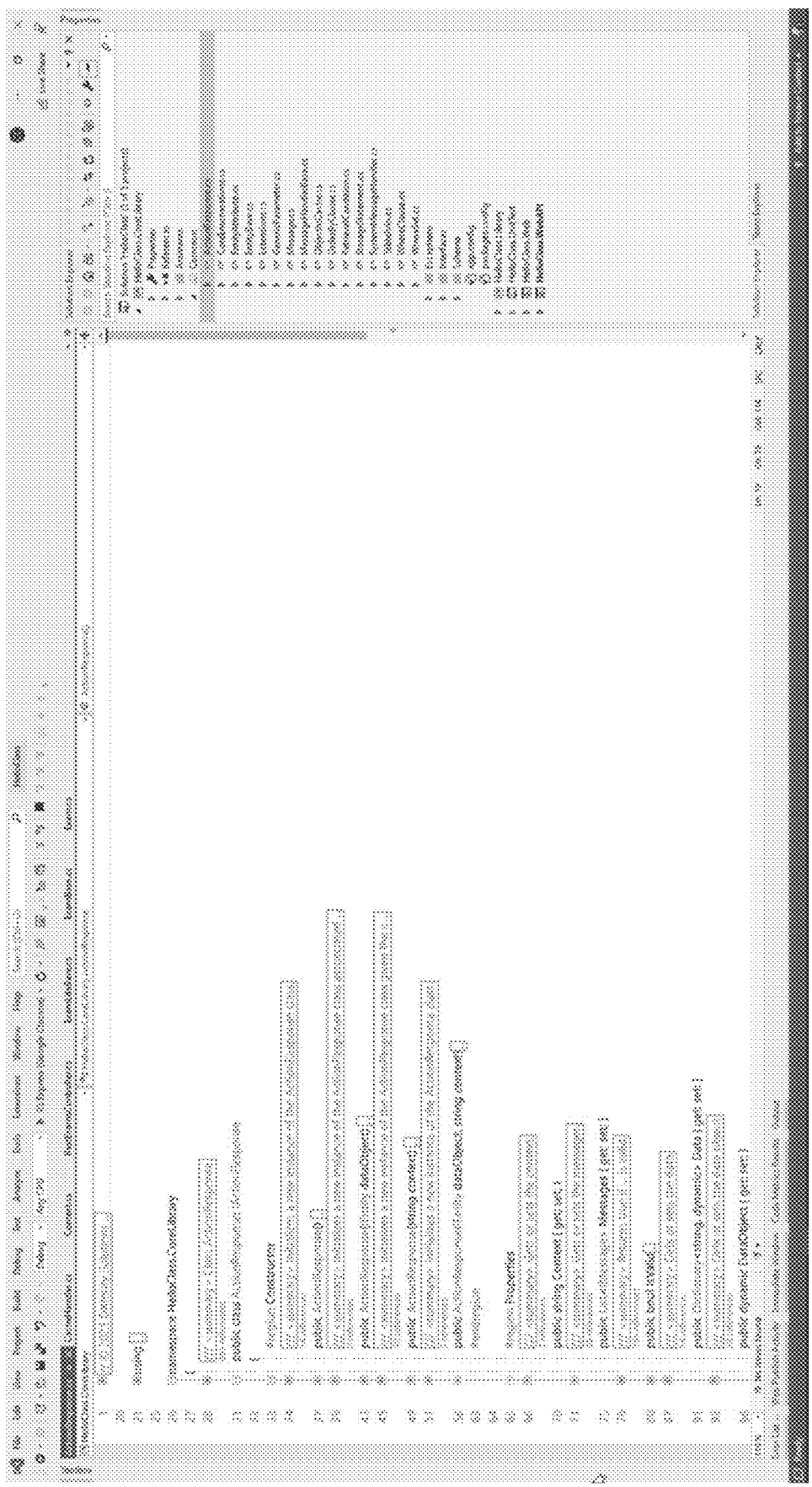
FIG. 11 is an example action-response pattern for a constructor.

FIG. 11 is an example of how to apply an action-response pattern to a constructor. The generated code may include a blank action-response pattern, providing the developer a place to set the properties.

As examples, action-responses may be created within the context of an entity where a user object needs to be updated or for bulk inserts or when a data object is created and initialized. The developer may create the action-response within the context for those specific entities.

A key part of the action-response is that it provides a collection of related messages. Thus, the action-response pattern may be a rich object in the sense that it specifies positive, negative, warning, and neutral responses.

Figure 12:
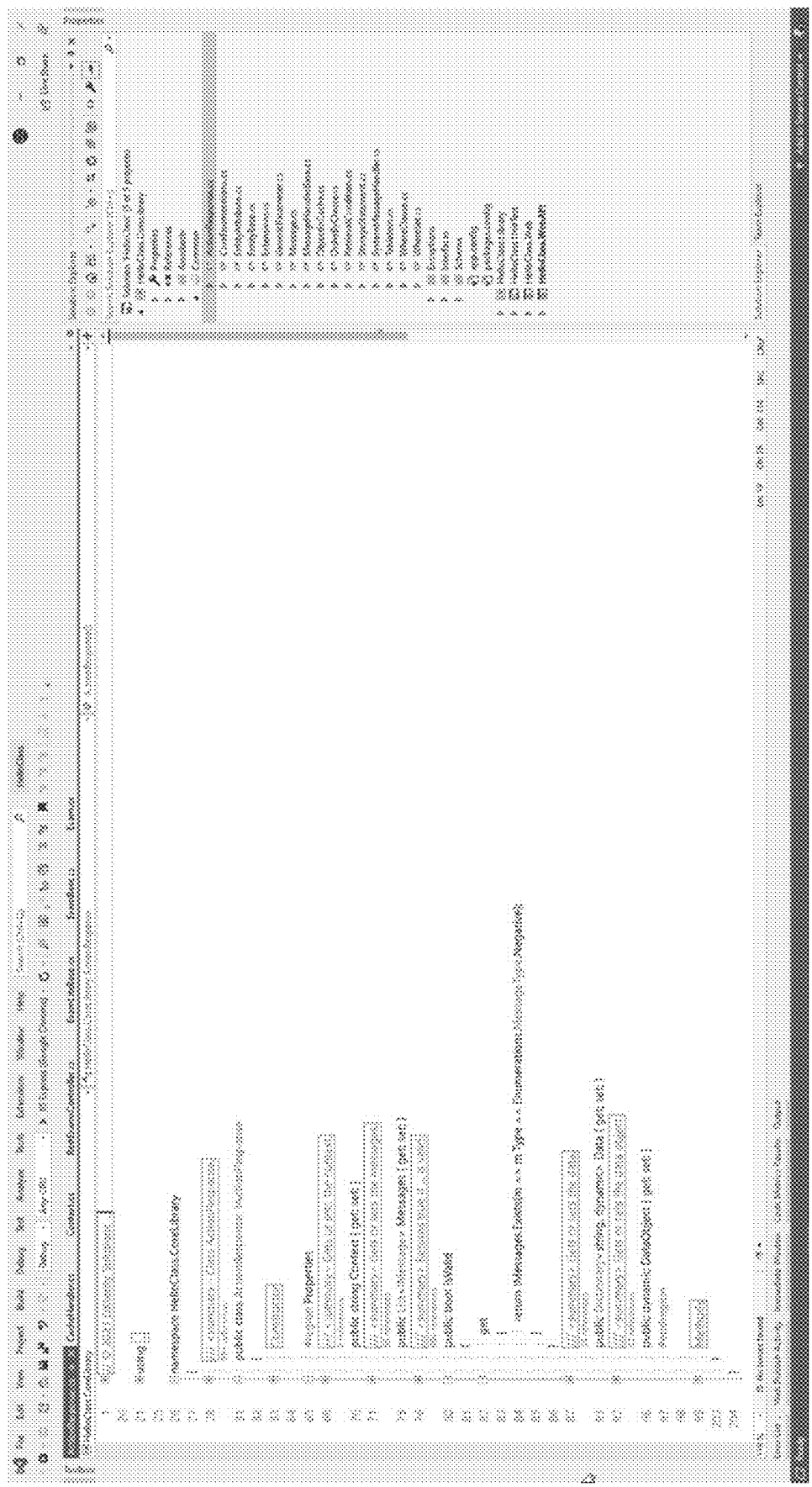
FIG. 12 shows example valid and negative response patterns.

FIG. 12 shows examples of valid and negative responses to a get property action. Note this example is specific to a C-sharp implementation, but it be understood that an equivalent set of valid and negative responses in other languages are possible, such as a Java method accessor.

Of course, the developer may also define their own additional response types within the same pattern as needed. There might be a couple of different warnings, and three positive responses. These response types may be extended as the solution requires. A common extension is to add an "information" class.

Therefore, action-response patterns may be used to handle warnings in an orderly fashion. In the case where an action is to persist a fully hydrated object, that action may in turn call ten (10) tiered methods. Responses are bubbled up through the messaging between tiers until they reach the uppermost tier; a UI tier for example. If only positive and no negative responses are received, then the UI tier may report the same. By providing a standard way to handle action-response patterns across a solution, they become far easier to manage.

The DXterity platform may use data dictionaries to support the ability to collect messages as they bubble up through the tiers. A dictionary may be a collection of named dynamic objects, a data structure or other similar technique. The dictionary may be, for example, a collection of strings ("positive" or "negative" responses), or a single integer (such as when the query is "How many widgets did we sell last month?"). The dictionary could be a rich object such as a list of 5 integer objects (When the query was "What were Susan Jones' grades this past semester?"; or it could even be a detailed report in the form of an XML file (e.g., the response to "What is the Chemistry Department's emergency procedure in case of a fire?").

This type of data object may be used to support appending a series of responses to actions as they "bubble up" through the tiers. Generally speaking, each method at each tier may have its own response. But it may handle such a response by adding it to a response that it received from another.

Figure 13:
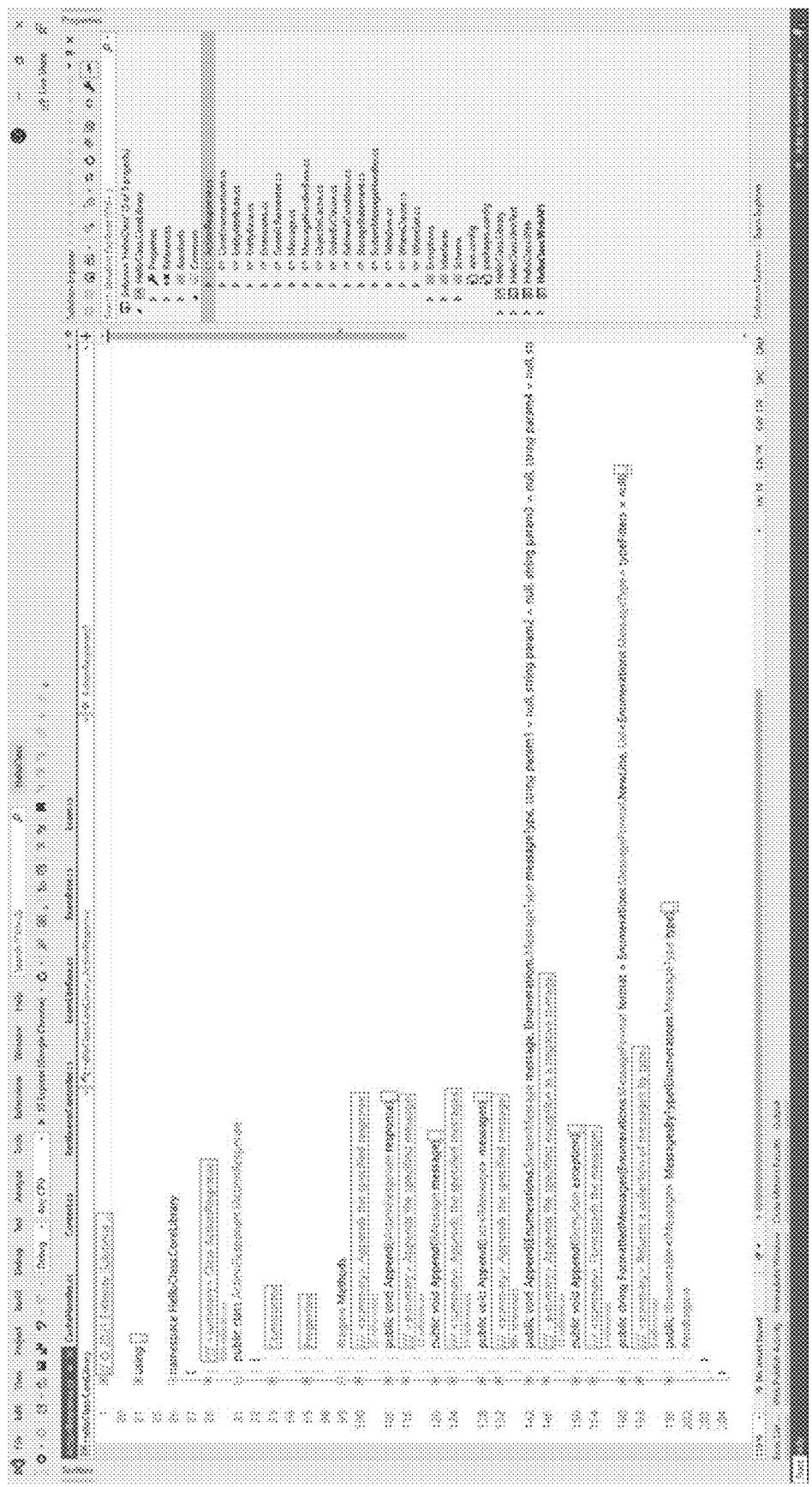
FIG. 13 is an example pattern for specifying response message filters and formats.

FIG. 13 is an example of an append method. A method may simply append its response to a message. Or it may append a collection of messages. It may append a very specific type of system message or it may append an exception.

Note too that a single "negative" response appended to a series of "positive" responses may cause the entire series to be treated as a negative response.

A tier may also specify a method to filter messages or format them. Such a method may, for example, filter messages by returning only the positive messages or only the negative messages. These types of methods may also return messages in a specific format (e.g., as an XML file with a new line character between each message).

These action-response patterns provide an orderly way to process messages among and between tiers from the base code all the way up through the UI tiers.

Code Authoring

The generated code may be interface driven in the sense that the database may be treated as an interface; languages may be treated interfaces; projects may be created as interfaces; operating systems may be treated as interfaces and the code author may be an interface.

Figure 14:
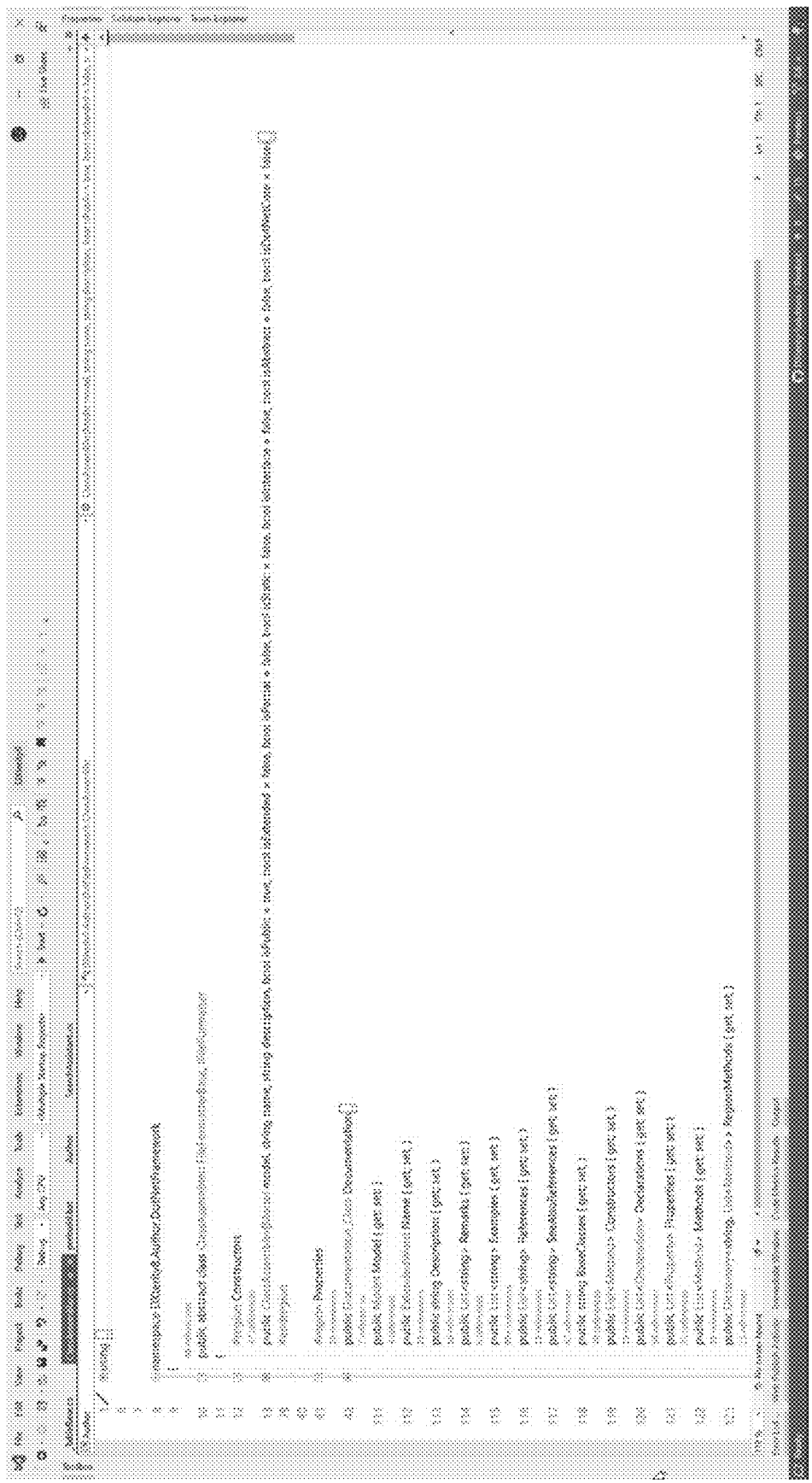
FIG. 14 is an illustration of what the code author does.

As FIG. 14 shows, the generated artifacts are organized by language (e.g., here the language ultimately generated may be a .Net framework) and then by project. In this case the code relates to a library project. Notice that the paths match exactly the paths to where the output is generated. As explained above, when the library project is generated it has core code, base code and extended code. Under extended code, in turn, there are entities, resources and templates (as an example).

Looking further into the organization of the generated code, the developer may see that a class includes a constructor folder, properties folder, methods folder, references folder and declarations folder. It can thus be appreciated that what looks like a "folder" in the solution explorer actually ends up being generated by the author as a single class. That class in turn is a collection of other classes which are constructors, declarations, properties, methods, and references.

Figure 15:
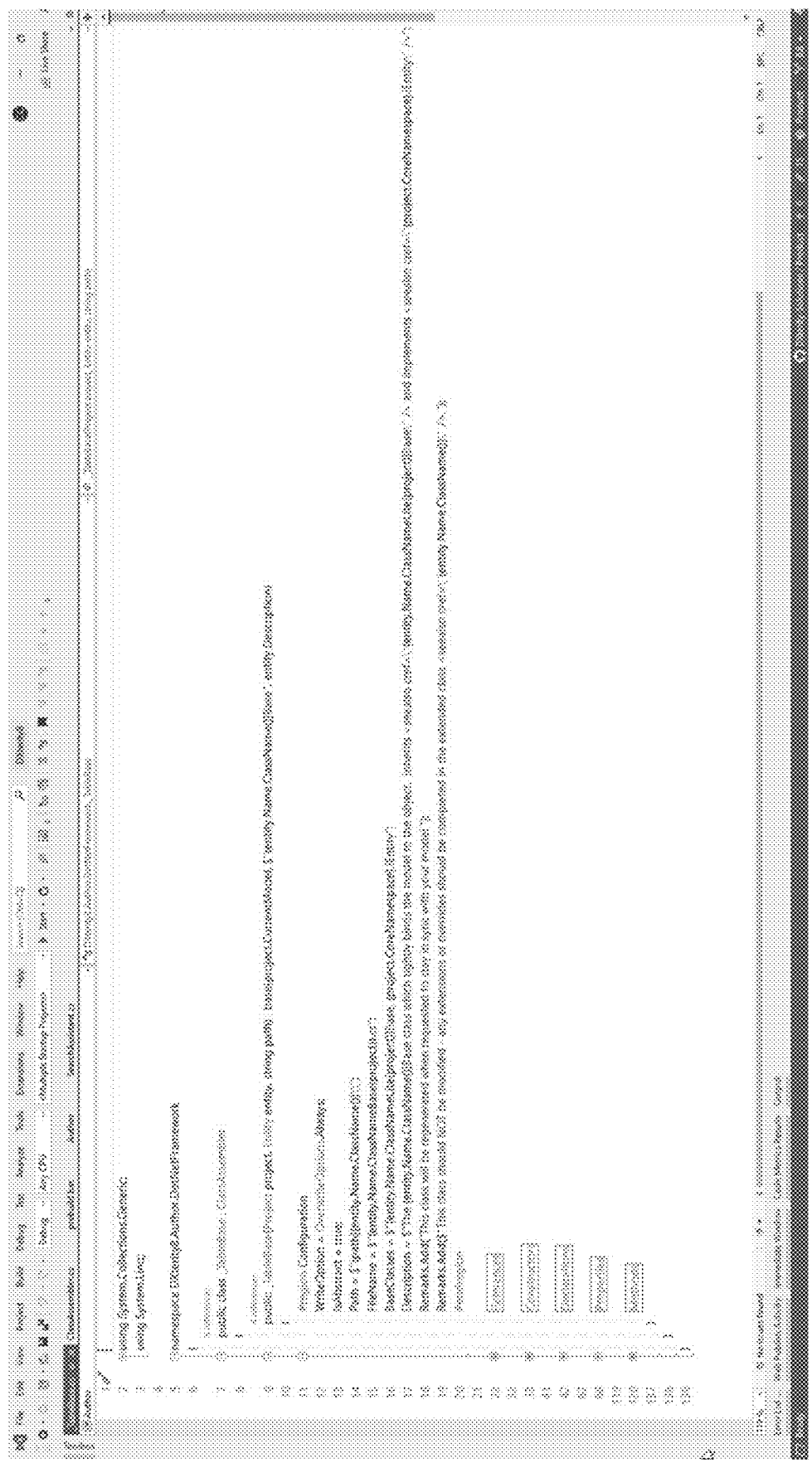
FIG. 15 is an example .Net framework for generated classes.

The author produces metadata at these levels. For instance, a constructor is a special type of method. In the example shown in FIG. 15, an example class may have six constructors, which follows a convention of being organized into tablebase constructors and then by identifier. Parameters and interfaces are also classes that have defined properties.

The author may not have to generate all of these metadata from scratch. The author may not have to define every constructor, every method, every property for every class. The author may use name space replacements or some other type of reference replacements called common resources. Each time code is compiled from the model, the common resources may be placed into a zip file (or other file archive).

In order to efficiently manage and maintain generated code as well as maximize code stability and eliminate code duplication, solution files may be authored by several techniques including in a line-by-line raw creation and in a resource file. Raw files are highly correlated to the model entity. Resources files may require minimal changes such as replacement of a variable or of a block of code.

Figure 16:
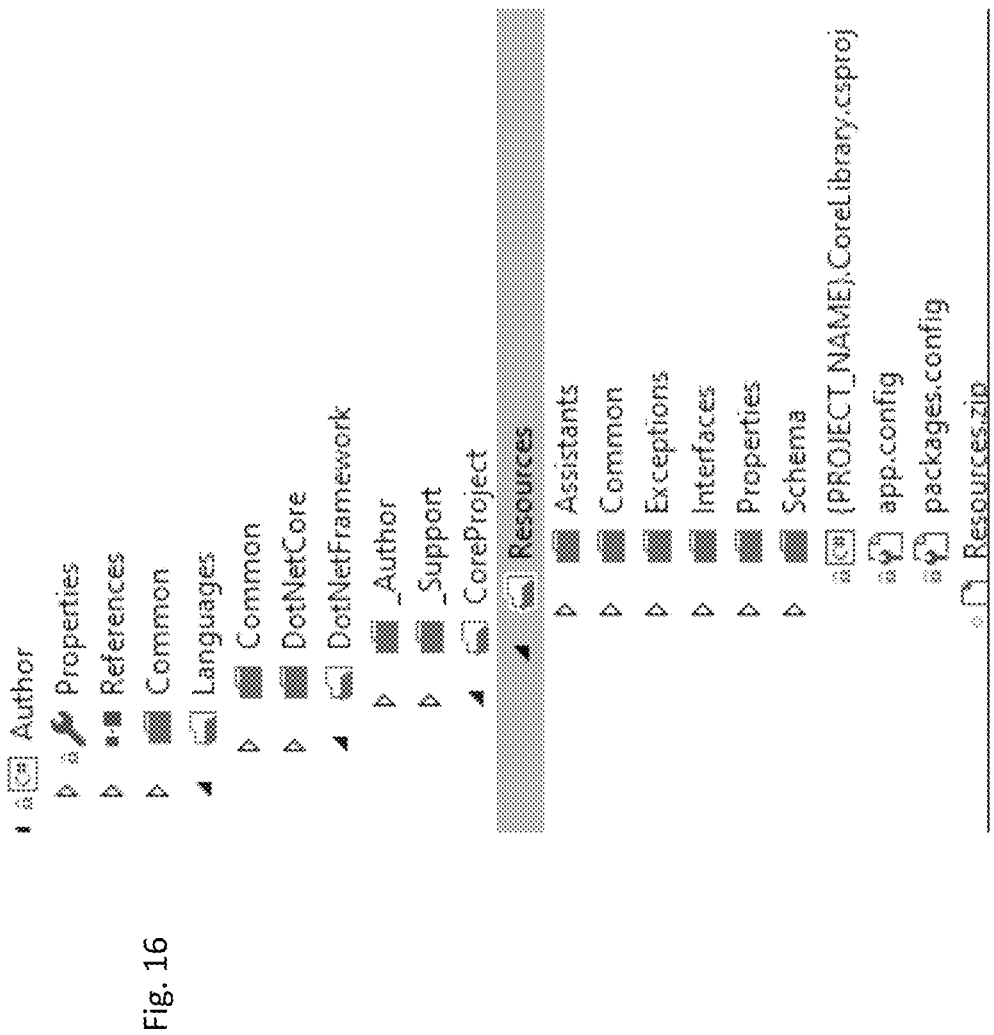
FIG. 16 shows the organization of an example resource file.

Resource files use a technique that was created to satisfy many operational constraints including the ability to simultaneously make global internal changes, make class specific changes, manage files based on output language, manage common files across multiple languages, edit files in an editor specific to class (config files, code files, html, etc.), change files names dynamically, manage files in relation to their final destination, integrate the reference files seamlessly into the solution/author and others. At the core to this technique may be the use of a Resource.zip file or other similar embedded resource files as well as the logical grouping of folders, as shown in FIG. 16.

Variable replacement by {NAMESPACE CORE} and syntax highlighting as well as other code may allow all files to be edited in a similar way. When the author is compiled a pre-build hook may compress all the resource files and replaces the related embedded resources. Properly configured the resource.zip files may be part of the solution such that the compiled code may have full access. Of particular interest is that the embedded resource files may not be copied to the generated output folder. The author when processing resource files may process each zip file in turn by transversing those file folders and subfolders to verify existence, to create if needed and perform any replacements and extract the file to the proper path.

Because the author zips this entire folder, the path may be extracted for that resource file. More generally, the subfolder structure is exactly what is actually generated as compiled code—in other words, it's the location where these individual things get generated to.

A file name may also be generated through replacements.

As mentioned previously, code may be written locally or remotely, such as to the cloud.

Figure 17:
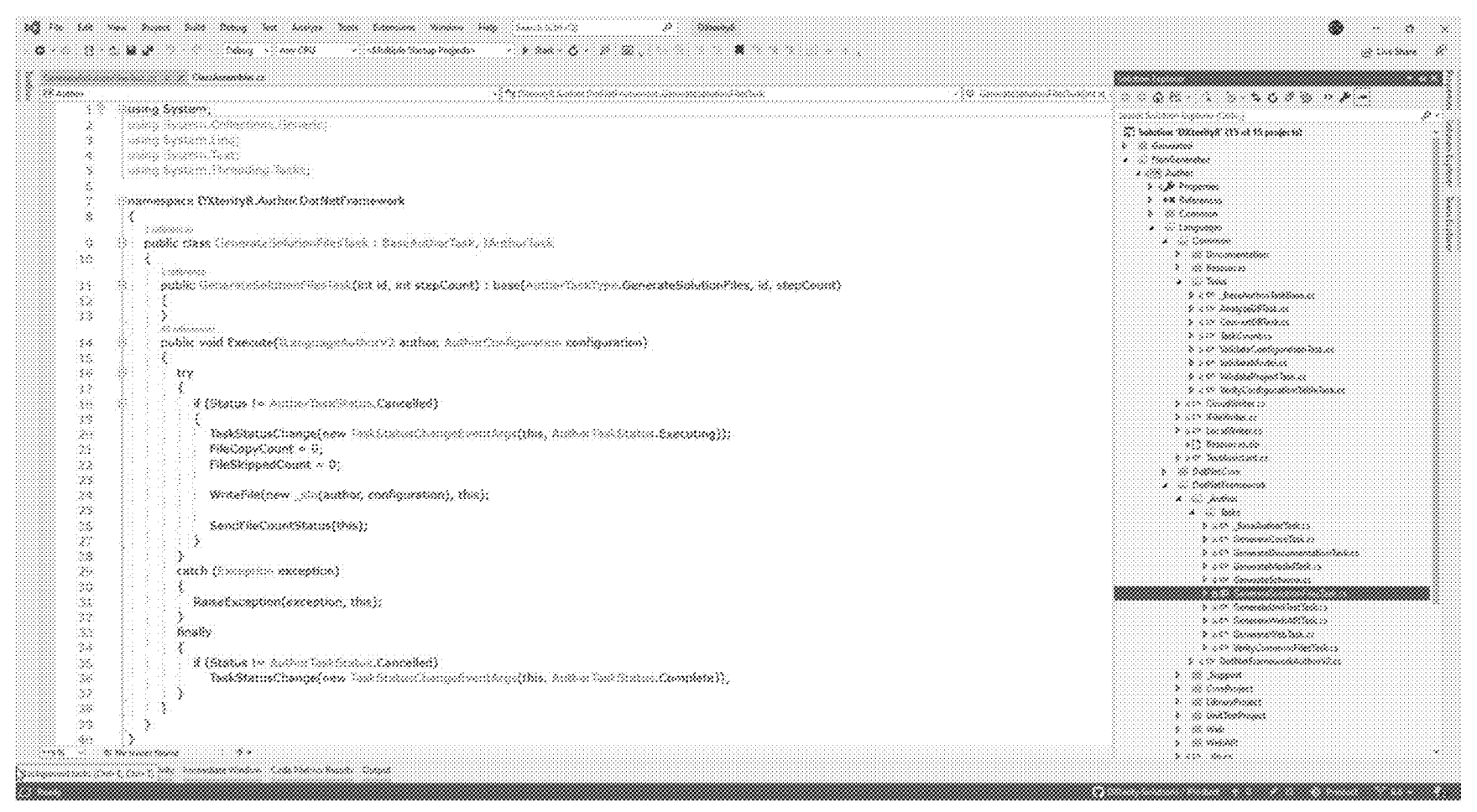

Furthermore, authored code may be further broken down into what are called tasks. FIG. 17 illustrates some examples. Example tasks include validating the model and validating the configuration.

Each language may have specific tasks that are organized by language, for example, such as a .Net framework or Java. An additional or alternative custom task, project or validation step may be easily inserted into this framework of generated codes.

Figure 18:
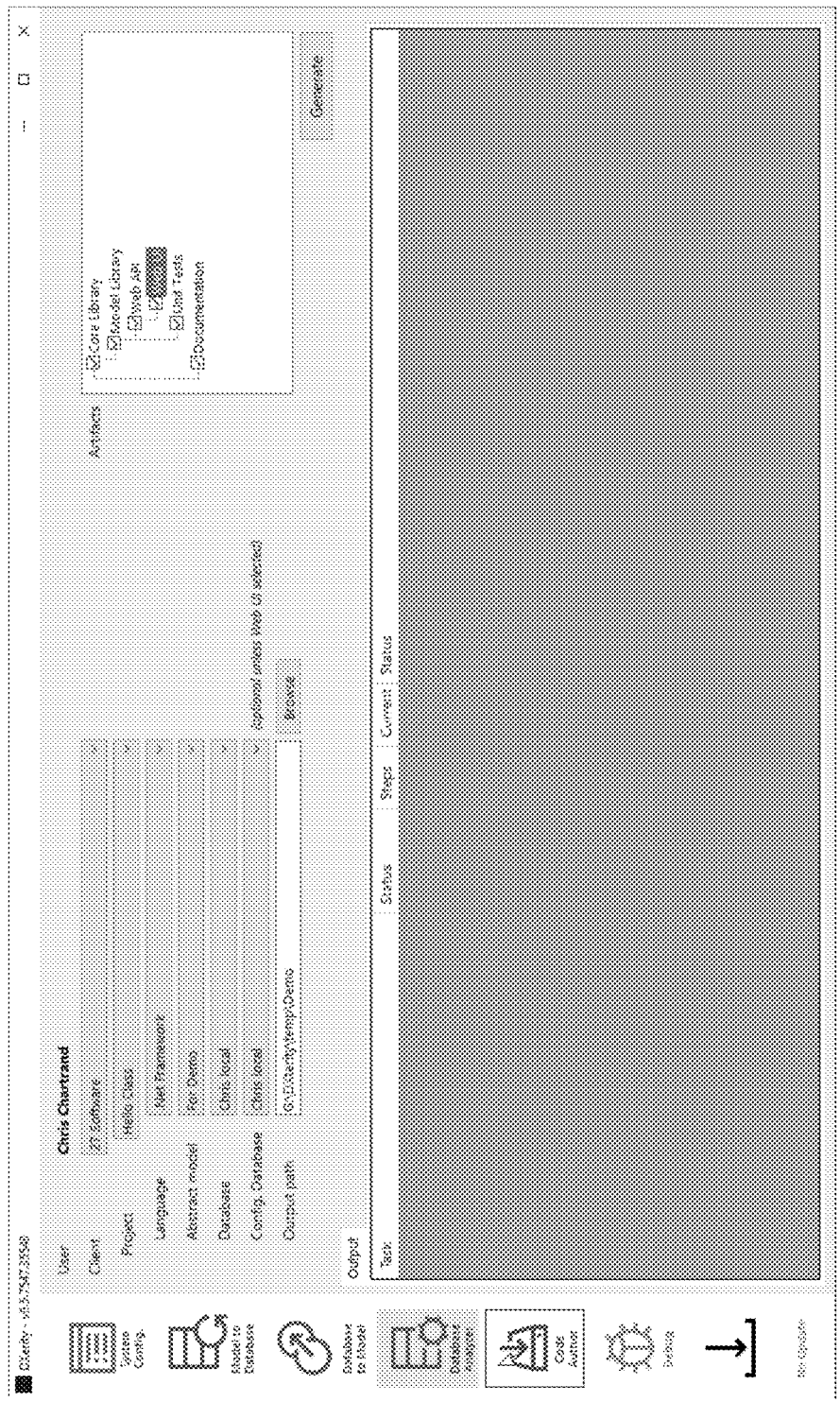
FIG. 18 is an example user interface for the author.

FIG. 18 is an example of a user interface for a developer to interact with the code author; in this case in the form of a Windows application. Applications for other operating systems may also be generated. The developer may select the customer, the project, the generated language, and interfaces. The choices may be selected from dropdown menus. In this case the developer is generating the "Hello class" project against the "For Demo" model for a .Net framework using the "Chris local" database.

The developer may also select artifacts to be generated or not generated such as a Core Library, Model Library, Web API, unit tests and documentation.

When the developer clicks on a generate tab, the DXterity platform starts creating tasks. At this stage the platform has completed validation of the configuration and validation of the project settings, but has not yet finished validating the model, verifying a configuration table and a list of other tasks. The list of other tasks, including generation tasks, may depend on the results of validation and configuration. In other words, the author may not initially know all of the tasks that it needs to perform until some of the initial configuration tasks are complete.

Tasks may be individually run as separate threads. If one task fails, the overall process stops. Additionally, the tasks may provide warnings to the developer.

As an example of the use of the interface, if after generating .Net code, the developer wishes to change to Java, then the same author interface is used to immediately generate the Java code or generate Java code in an alternate operating system. The author validates the configuration and the model in the same way for generating code in either language.

User Interface Patterns

The DXterity platform also generates user interface contexts as patterns. As explained above, DXterity constructs an abstract model and generates output using that abstract model. The abstract model can be further consumed and converted to what is called a schema that relates to some aspect of a user interface. The schema is then made available to the application logic tiers (base and extended) as well as to the web UI tier.

Figure 19:
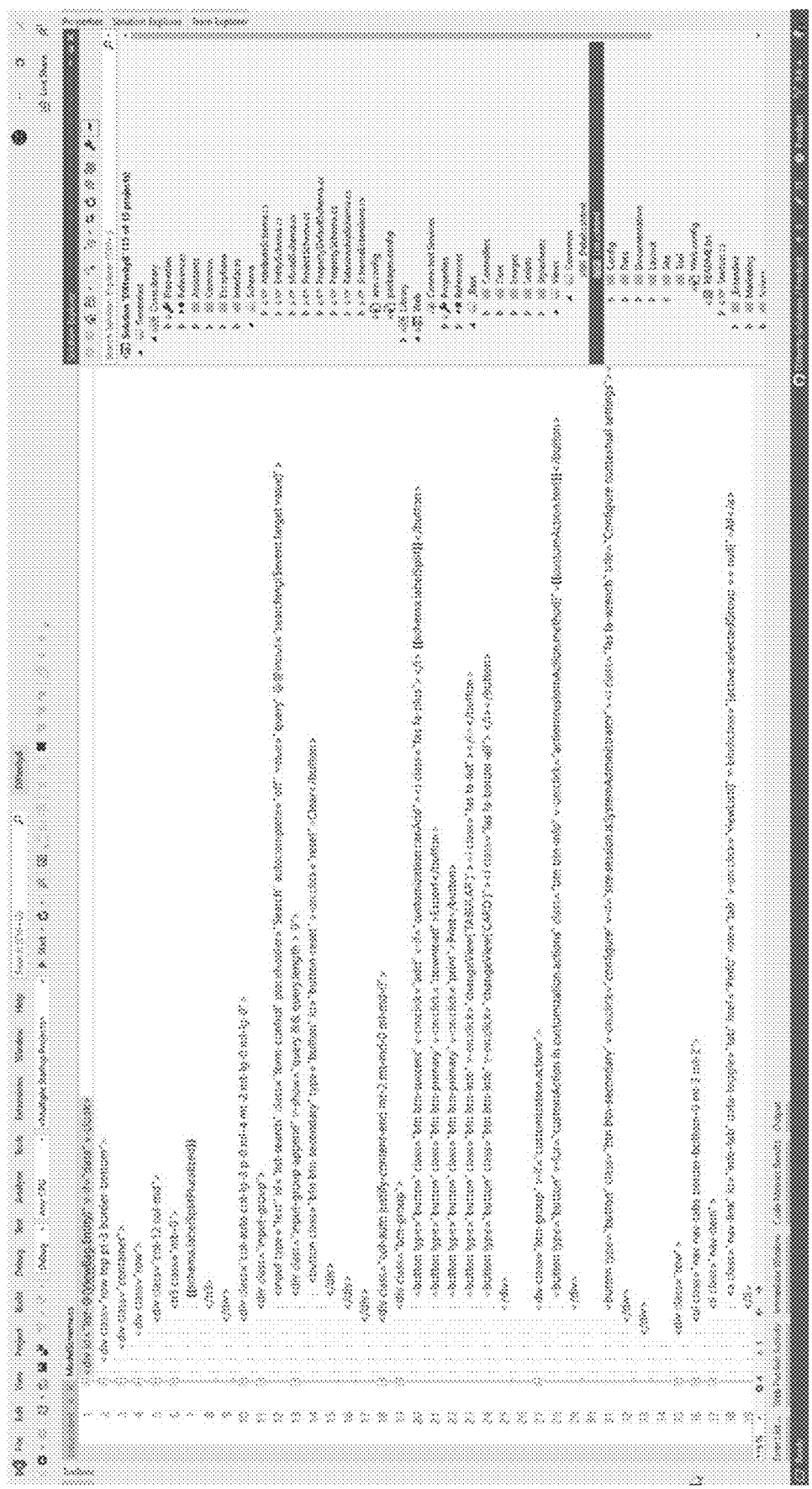
FIG. 19 is an example of where UI schema are stored.

Initially the generated web UI solution does not have specific information about the views that are appropriate for specific entities or entity types. The traditional methodology for programming is to control or define a view for each entity. However, with the DXterity platform, the web UI components dynamically consume the schema. For example, when the generated code loads a page for an end user of the generated application, the page looks like it's a custom page. However, the page is actually generated by using the schema to control the rendering. FIG. 19 is an example of where the schema may be stored among the generated code. As a result, a single complicated page may be maintained instead of many different simpler pages, making management of revisions and maintenance much easier and efficient.

Figure 20:
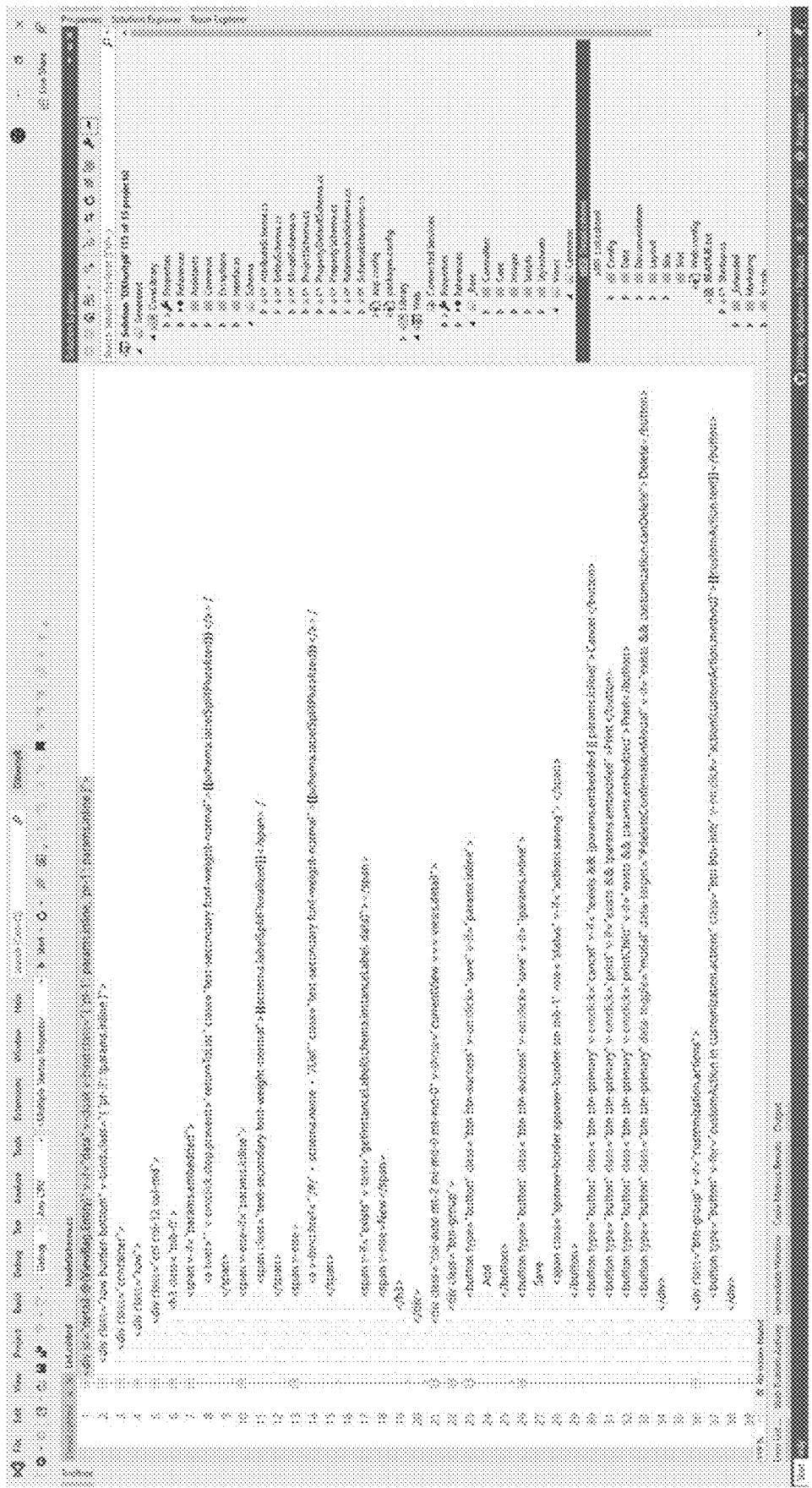
FIG. 20 is an example list schema.

FIG. 20 illustrates an example schema for a list view. The schema may be invoked any time a list needs to be displayed in the UI. It may include the reporting elements, a card view, a list view, support searching, sorting, exporting, and other functions appropriate to a list. Labels and custom actions may be defined here as well.

Figure 21:
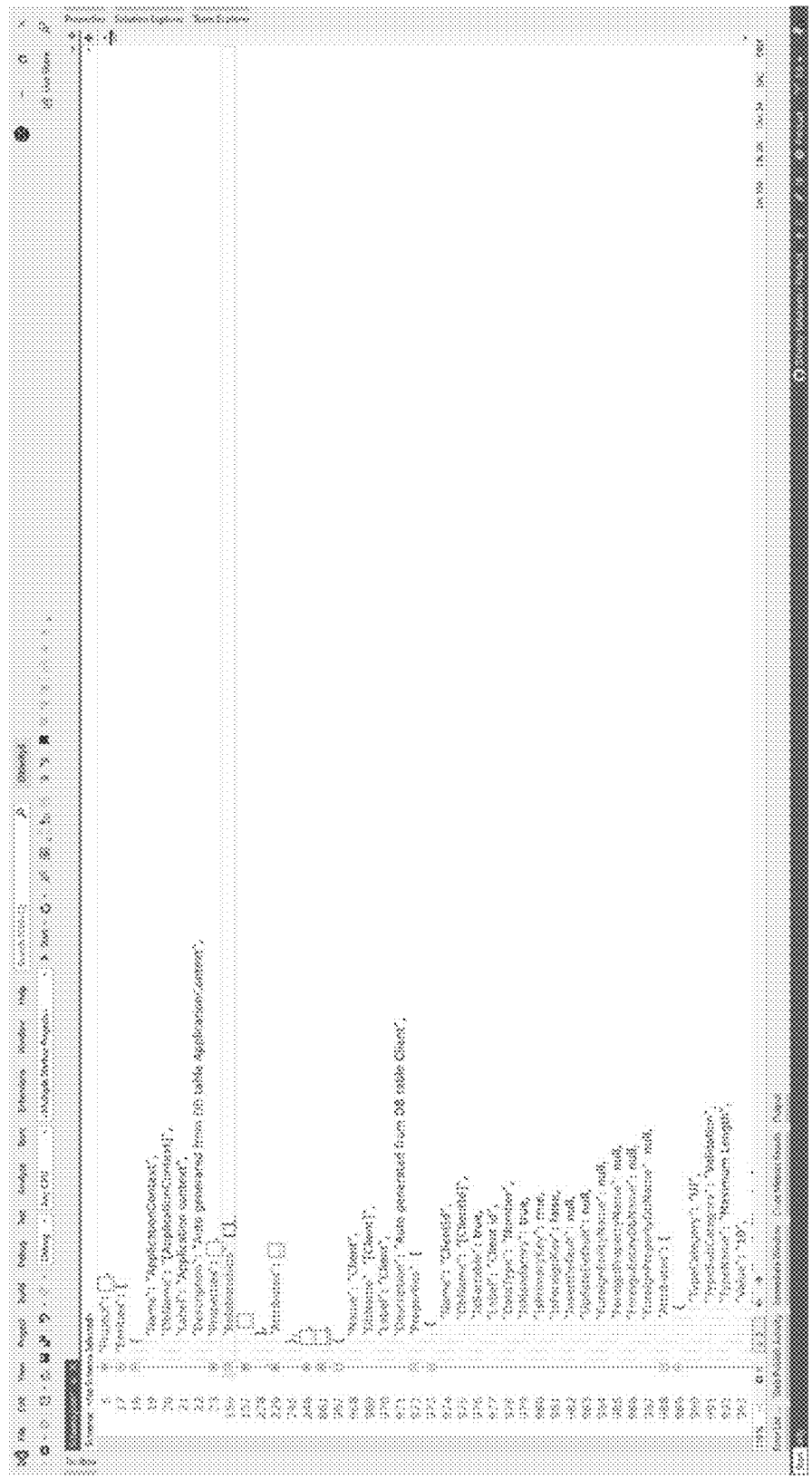
FIG. 21 is an example of a detailed schema.

FIG. 21 is an example of a detailed schema. The details may be used to define another type of UI page that dynamically renders the page in groups based on whatever properties the object has. It may specify whether it should be visible, when should it be visible, how should it be grouped, what are defaults, how to print it, and so forth.

There may not be page specific views. Rather, the views may be driven by schema—meaning that the developer does not have to design and maintain each and every page separately.

Figure 22:
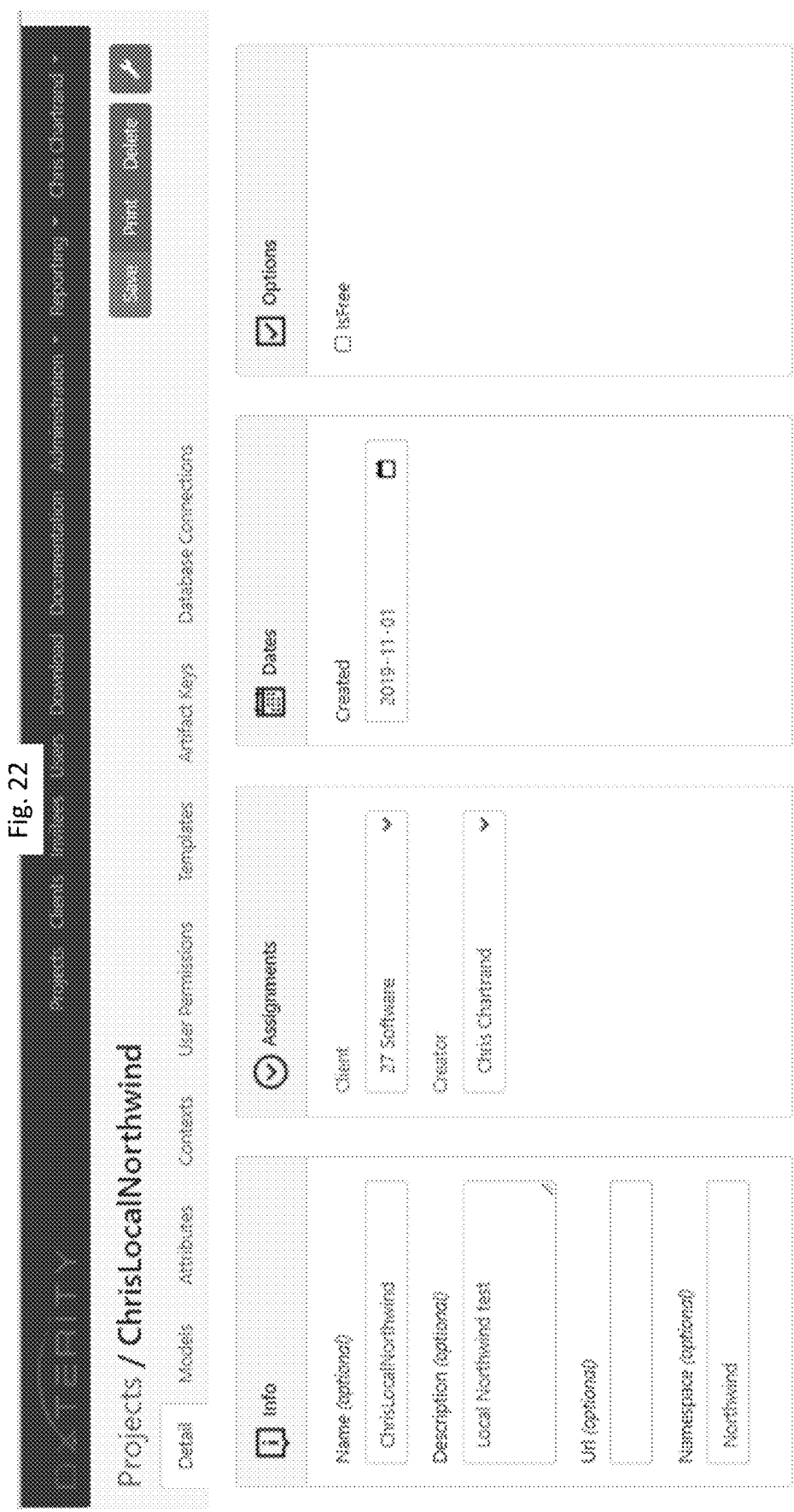
FIG. 22 is an example UI for defining a schema.

FIG. 22 is an example of how a developer may specify the schema for a web UI. The schema understands dates, checkboxes, and dropdowns so when a foreign key relationship is identified, the schema renders the UI page as the appropriate data type of the object. The schema knows what's mandatory and what's optional. It supports actions such as save, print, delete. Most importantly, because the UI is based off that schema it knows that these artifacts are all related to this object.

Figure 23:
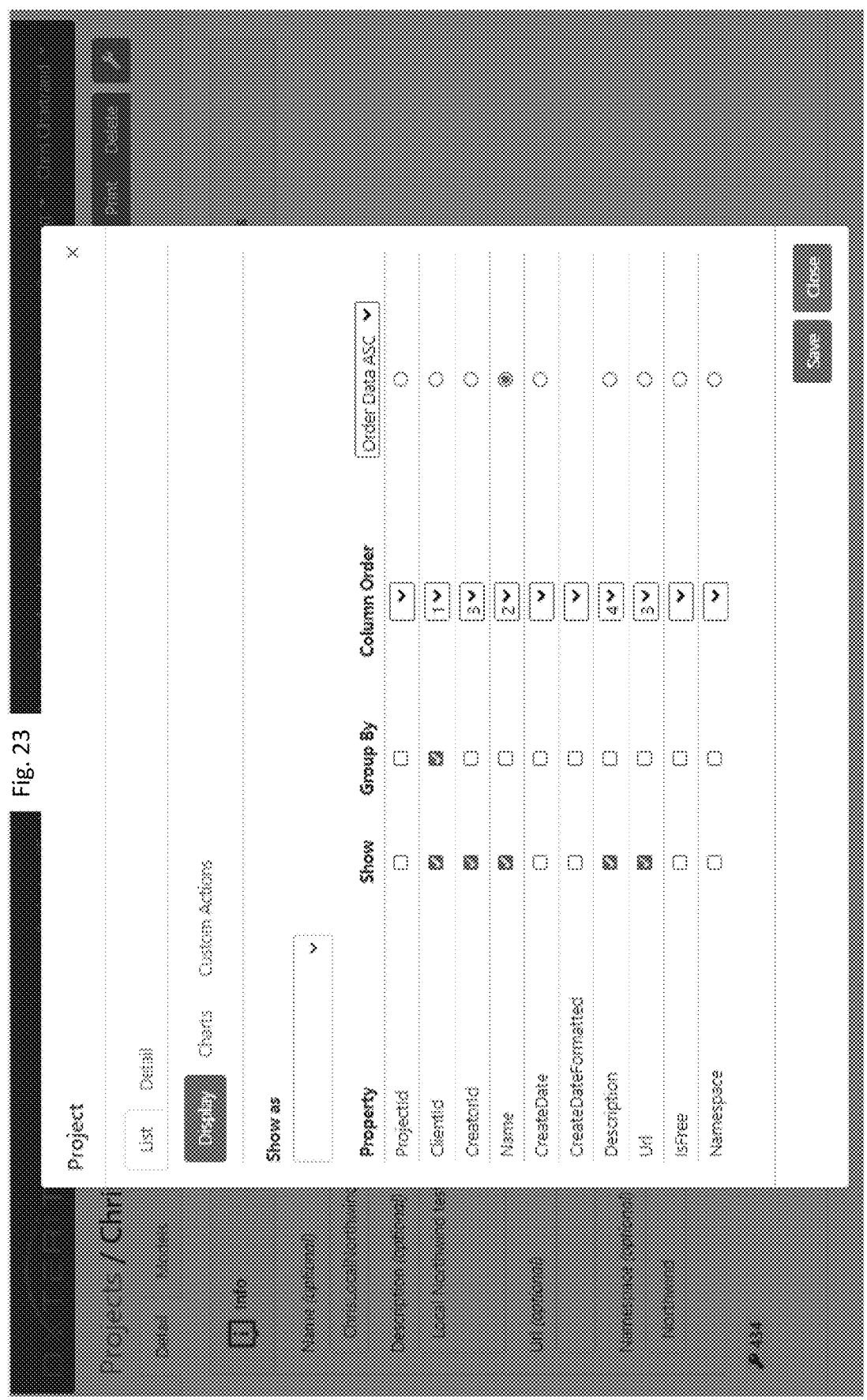
FIG. 23 shows how a developer may specify UI attributes for a class.

Note that these features are not generated via customized code, but rather through a UI and storing a configuration file. FIG. 23 is an example of how the developer may specify the display attributes for the classes associated with a project. A default view may be specified for each. Each class may be enabled or disabled for display, or grouping. A column order may be specified, and whether it is displayed in ascending or descending order.

The developer may specify that a particular JavaScript function is to be called when a certain button is clicked.

Figure 24:
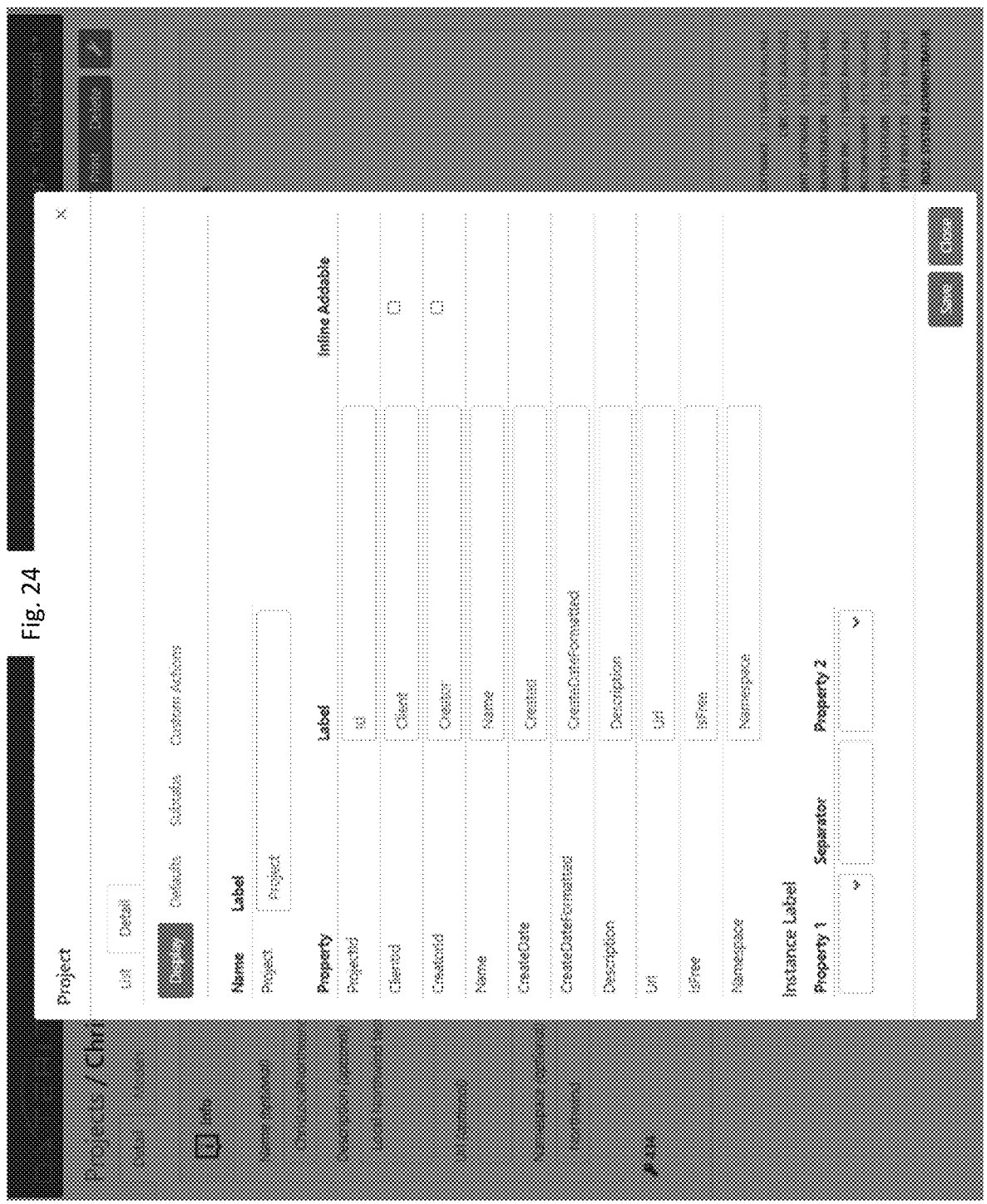
FIG. 24 shows how a developer may specify custom actions

In another example, FIG. 24 shows a detailed action view. Here a class might be called "ClientID" as a database entity. However, the developer prefers that class to be displayed as just "Client". So, the displayed name of a class may be changed here in the UI schema.

In another instance, the developer may want to add a child object that needs to be submitted at the same time as a group. That child object may also be configured using the schema.

The developer may also configure subtabs, and decide whether to show them or not and to reorder them.

It may therefore be appreciated that the DXterity platform may be used to rapidly generate code and an entire enterprise solution from a model. However, the generated code is structured to protect generated code from developer modifications while still fully supporting desired customizations.

Figure 25:
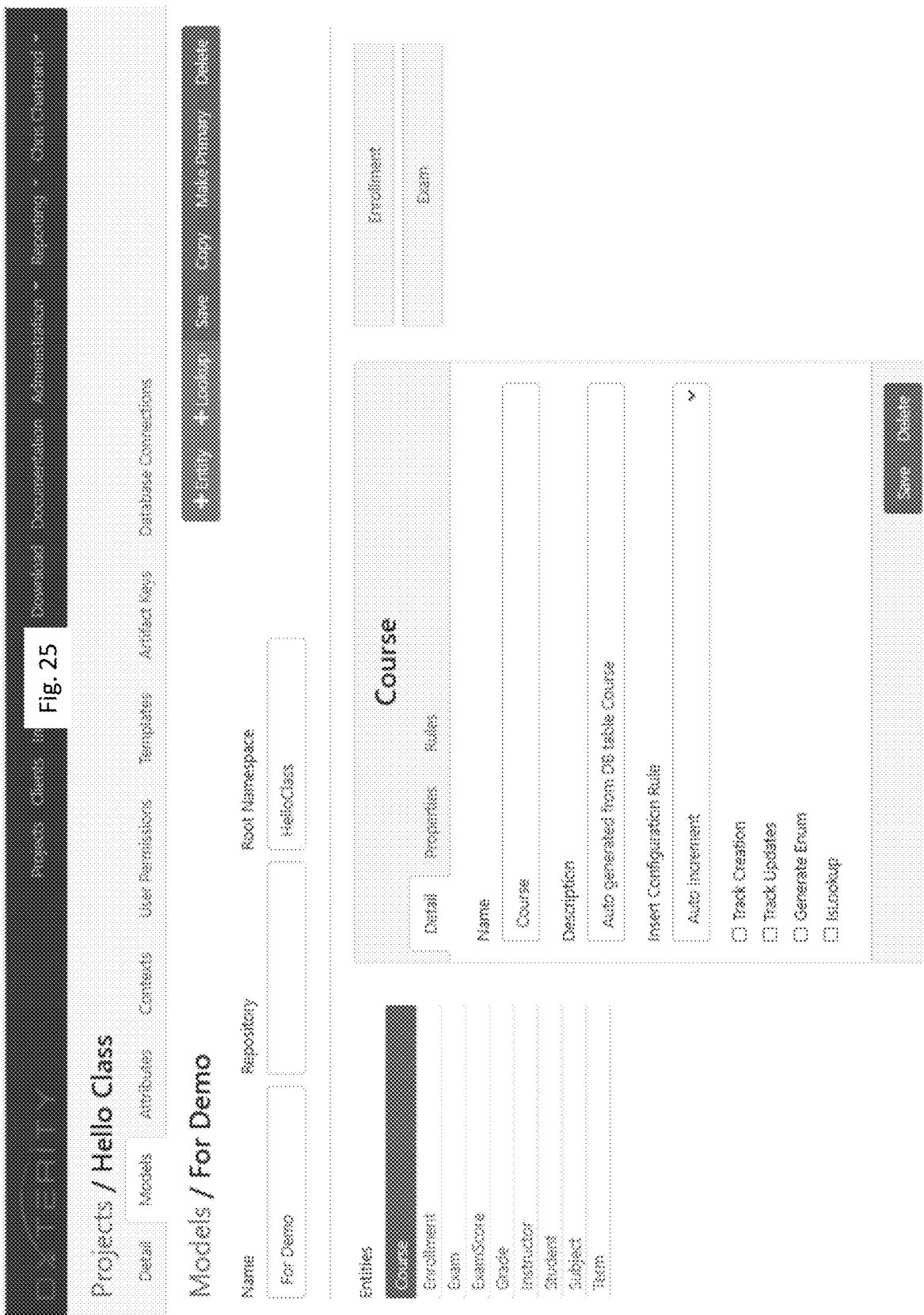
FIG. 25 is an example end user Web interface.

FIG. 25 is an example of an end user web interface that was generated by DXterity.

Further Implementation Options

It should be understood that the example embodiments described above are not intended to be exhaustive or limited to the precise form disclosed, and thus may be implemented in many different ways. In some instances, the various "data processors" may each be implemented by a separate or shared physical or virtual or cloud-implemented general-purpose computer having or having access to a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments of the components may therefore typically be implemented in hardware, firmware, software or any combination thereof. In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that may be rapidly provisioned and released with minimal management effort or service provider interaction. Such cloud computing deployments are relevant and typically preferred as they allow multiple users to access computing. By aggregating demand from multiple users in central locations, cloud computing environments can be built in data centers that use the best and newest technology, located in the sustainable and/or centralized locations and designed to achieve the greatest per-unit efficiency possible.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block, flow, network and code diagrams and listings may include more or fewer elements, be arranged differently, or be represented differently.

Other modifications and variations are possible in light of the above teachings. For example, while a series of steps has been described above with respect to the flow diagrams, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

Certain portions may be implemented as "logic" that performs one or more functions. This logic may include hardware, such as hardwired logic, an application-specific integrated circuit, a field programmable gate array, a microprocessor, software, wetware, or a combination of hardware and software. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

Also, the term "user", as used herein, is intended to be broadly interpreted to include, for example, a computer or data processing system or a human user of a computer or data processing system, unless otherwise stated.

Also, the term "developer" as used herein is a particular type of user who is enabled to create software applications or systems that run on a computer or another device; analyze other users' needs and/or then design, develop, test, and/or maintain software to meet those needs; recommend upgrades for existing programs and systems; and/or design pieces of an application or system and plan how the pieces work together.

The above description has particularly shown and described example embodiments. However, it should be understood by those skilled in the art that various changes in form and details may be made therein without departing from the legal scope of this patent as encompassed by the appended claims.

The invention claimed is:

1. A method for generating code from an abstract model of a database, comprising:
   generating base application code from the model;
   generating an extended application code structure for subsequent placement of extended application code, wherein aspects of the extended application code structure are inherited from the generated base application code, and wherein components of the extended application code include one or more code extensions, attributes, properties or rules that are specified other than by generating from the model;
   storing the extended application code structure separately from the base application code;
   exposing the base application code and the extended application code structure for developer review, with a warning that the base application code will be regenerated;
   accepting developer modifications to the extended application code; and wherein the extended application code structure further comprises patterns that define further aspects of the generated base application code.

2. The method of claim 1 wherein the patterns comprise:
a context pattern that defines handler classes for one or more contextual elements for the generated code.

3. The method of claim 2 wherein the contextual elements are global to the application.

4. The method of claim 2 wherein the contextual elements are selected from Localization, Messaging, Logging, Exception management, Auditing, Validation, Cryptography, Communications, or Cache management.

5. The method of claim 1 wherein the patterns additionally comprise:
action-response patterns that define responses generated as a result of actions taken.

6. The method of claim 5 wherein the action-response patterns define serialization of responses among code tiers or between code tiers.

7. The method of claim 1 wherein the generated based application code and extended application code structure comprise enterprise class application logic code, API code and UI code.

8. The method of claim 5 wherein the action-response patterns include append methods that define how to responses to successive responses from other tiers.

9. The method of claim 1 wherein the base code and extended application code structure are organized by language and then by project.

10. The method of claim 9 wherein the base code has constructors, declarations, methods and properties classes.

11. The method of claim 10 wherein the base application code is further broken into code generation-related tasks.

12. The method of claim 10 wherein a schema defines attributes of a user interface associated with classes.

13. The method of claim 12 additionally comprising:
generating a user interface by consuming the schema at a time a web page view is requested.

14. The method of claim 1 wherein the base application code and extended application code are provided for at least two different languages, databases, interfaces, or operating systems.

15. A system for generating code from an abstract model, comprising:
a computing platform having one or more processors and one or more computer readable memory devices;
program instructions embodied by the one or more computer readable memory devices, the program instructions causing one or more of the processors, when executed, to generate the code by further:
generating base application code from the model;
generating an extended application code structure for subsequent placement of extended application code, wherein aspects of the extended application code structure are inherited from the generated base application code, and wherein components of the extended application code include one or more code extensions, attributes, properties or rules that are specified other than by generating from the model;
storing the extended application code structure separately from the base application code;
exposing the base application code and the extended application code structure for developer review, with a warning that the base application code will be regenerated;
accepting developer modifications to the extended application code; and wherein the extended application code structure further comprises patterns that define further aspects of the generated base application code.

16. The system of claim 15 wherein the patterns comprise:
a context pattern that defines handler classes for one or more contextual elements for the generated code.

17. The system of claim 16 wherein the contextual elements are "global" to the application.

18. The system of claim 16 wherein the contextual elements are selected from Localization, Messaging, Logging, Exception management, Auditing, Validation, Cryptography, Communications, and Cache management.

19. The system of claim 15 wherein the patterns additionally comprise:
action-response patterns that define responses generated as a result of actions taken.

20. The system of claim 19 wherein the action-response patterns define serialization of responses among code tiers or between code tiers.

21. The method of claim 15 wherein the generated based application code and extended application code structure comprise enterprise class application logic code, API code and UI code.

22. The system of claim 19 wherein the action-response patterns include append methods that define how to responses to successive responses from other tiers.

23. The system of claim 15 wherein the base code and extended application code structure are organized by language and then by project.

24. The system of claim 23 wherein
the base code has constructors, declarations, methods and properties classes.

25. The system of claim 24 wherein the base application code is further broken into code generation-related tasks.

26. The system of claim 24 wherein a schema defines attributes of a user interface associated with classes.

27. The system of claim 26 wherein the program code is further for:
generating a user interface by consuming the schema at a time a web page view is requested.

28. The system of claim 15 wherein the base application code and extended application code are provided for at least two different languages, databases, interfaces, or operating systems.

29. A computer program product comprising a non-transitory computer usable storage medium having readable program code embodied in the storage medium, the computer program product includes at least one component of an enterprise class code generation platform operable for:
generating base application code from a model;
generating an extended application code structure for subsequent placement of extended application code, wherein aspects of the extended application code structure are inherited from the generated base application code, and wherein components of the extended application code include one or more code extensions, attributes, properties or rules that are specified other than by generating from the model;
storing the extended application code structure separately from the base application code;
exposing the base application code and the extended application code structure for developer review, with a warning that the base application code will be regenerated;
accepting developer modifications to the extended application code; and wherein the extended application code structure further comprises patterns that define further aspects of the generated base application code.

\* \* \* \* \*